US012333439B2

(12) United States Patent
Gong et al.

(10) Patent No.: US 12,333,439 B2
(45) Date of Patent: Jun. 17, 2025

(54) DE-CENTRALISED LEARNING FOR RE-INDENTIFICATION

(71) Applicant: Veritone, Inc., Denver, CO (US)

(72) Inventors: Shaogang Gong, London (GB); Guile Wu, London (GB)

(73) Assignee: VERITONE, INC., Denver, CO (US)

( * ) Notice: Subject to any disclaimer, the term of this patent is extended or adjusted under 35 U.S.C. 154(b) by 319 days.

(21) Appl. No.: 17/795,959

(22) PCT Filed: Jan. 29, 2021

(86) PCT No.: PCT/GB2021/050216
§ 371 (c)(1),
(2) Date: Jul. 28, 2022

(87) PCT Pub. No.: WO2021/152329
PCT Pub. Date: Aug. 5, 2021

(65) Prior Publication Data
US 2023/0087863 A1    Mar. 23, 2023

(30) Foreign Application Priority Data
Jan. 30, 2020  (GB) ..................................... 2001313

(51) Int. Cl.
*G06V 10/774* (2022.01)
*G06N 3/082* (2023.01)
(Continued)

(52) U.S. Cl.
CPC ........... *G06N 3/082* (2013.01); *G06V 10/761* (2022.01); *G06V 10/7715* (2022.01);
(Continued)

(58) Field of Classification Search
CPC .. G06N 3/082; G06V 10/778; G06V 10/7715; G06V 10/761; G06V 10/82; G06V 10/95; G06V 10/774; G06V 20/52
(Continued)

(56) References Cited

U.S. PATENT DOCUMENTS

2016/0239711 A1\*  8/2016  Gong .................... G06V 40/173
2017/0177946 A1\*  6/2017  Citerin ................. G06V 40/173
(Continued)

FOREIGN PATENT DOCUMENTS

| CN | 108345860 A | 7/2018 |
|---|---|---|
| GB | 2556981 A | 6/2018 |

OTHER PUBLICATIONS

Apr. 6, 2021—(WO) International Search Report and Written Opinion—PCT/GB2021/050216.
(Continued)

*Primary Examiner* — Allen H Nguyen
(74) *Attorney, Agent, or Firm* — ONE LLP

(57) ABSTRACT

A method for generating an optimised domain-generalisable model for re-identification of a target in a set of candidate images. The method optimises a local feature embedding model for domain-specific feature representation at each client of a plurality of clients, then receives, at a central server, information on changes to the local feature embedding model at each respective client resulting from the optimising step, and then updates a global feature embedding model based on the changes to the local feature embedding model. The method further receives, at each client from the central server, information representative of the updates to the global feature embedding model, then maps, at each client, on to the respective local feature embedding model at least a portion of the received updates, and subsequently updates, at each client, the respective local (Continued)

feature embedding model based on the mapped updates. The steps are repeated until convergence criteria are met, wherein the global feature embedding model is the optimised domain-generalisable model for re-identification of a target in a set of candidate images.

18 Claims, 9 Drawing Sheets

(51) Int. Cl.
    *G06V 10/74* (2022.01)
    *G06V 10/77* (2022.01)
    *G06V 10/778* (2022.01)
    *G06V 10/82* (2022.01)
    *G06V 10/94* (2022.01)
    *G06V 20/52* (2022.01)

(52) U.S. Cl.
    CPC .......... *G06V 10/774* (2022.01); *G06V 10/778* (2022.01); *G06V 10/82* (2022.01); *G06V 10/95* (2022.01); *G06V 20/52* (2022.01)

(58) Field of Classification Search
    USPC ........................................................ 382/159
    See application file for complete search history.

(56) References Cited

U.S. PATENT DOCUMENTS

2019/0227980 A1    7/2019  McMahan et al.
2022/0374630 A1*  11/2022  Huang .................. G06F 18/214

OTHER PUBLICATIONS

Hao et al., "Edge AIBench: Towards Comprehensive End-to-End Edge Computing Benchmarking", Advances in Cryptology—Crypto 2018, Part III; [Lecture Notes in Computer Science; Lect. Notes Computer], pp. 23-30, Oct. 8, 2019.

Jiang et al., "Distributed Deep Learning Optimized System over the Cloud and Smart Phone Devices", IEEE Transactions on Mobile Computing, vol. 20, No. 1, pp. 147-161, Sep. 16, 2019.

Yang et al., "Federated Machine Learning: Concept and Applications", ACM Transactions on Intelligent Systems and Technology, vol. 10, No. 2, Jan. 28, 2019.

Orekondy et al., "Understanding and Controlling User Linkability in Decentralized Learning", arXiv.org, arXiv:1805.05838v1, May 15, 2018.

Jul. 17, 2020—(GB) Search and Examination Report—GB2001313.2.

* cited by examiner

DE-CENTRALISED LEARNING FOR RE-IDENTIFICATION

FIELD OF THE INVENTION

A method and system for generating an optimised domain-generalisable model for zero-shot recognition or identification of a target in a set of candidate images. The model is developed via de-centralised learning, andp is not based on any single data set. Specifically, the method and system provide an optimised model which can be applied for re-identification of a visual target in a set of candidate images.

BACKGROUND TO THE INVENTION

Person re-identification on urban streets at city-wide scales is useful in smart city design (for example, population flow management), and for public safety (for example, finding a missing person). Previous studies have shown success in employing deep learning to model visual data, and in using such a model to identify targets (such as a specific person) within a large quantity of visual data. Prior methods have often assumed that use of a larger data set for training and optimising will provide a more adaptive model. Furthermore, as images gathered in different geographical locations may each exhibit local characteristics—such as clothing or appearance of persons within the visual data—it has been expected that a better global (or domain-generalisable) model may be obtained by training the model on a variety of shared and centralised data sets from different locations. Nevertheless, increasing privacy concerns and awareness of data protection requirements provide a competing challenge for developing such global models, as there is increasingly less willingness to share and centralise locally obtained visual data in order to provide the 'big data' preferred in deep learning.

A technique—federated learning—has been proposed to address some of these problems (for instance, Konečný et al. arXiv preprint, arXiv:1610.05492 (2016), or McMahan et al., AISTATA (2017)). Federated learning is a machine learning technique which allows local users to collaboratively train a centralised model without sharing local data. However, existing federated learning techniques aim to learn a shared model for decentralised data having the same class space (in other words, the same set of labels and descriptors across all the local data sets, although distributions of each local data set may be different), and with all the target classes having labelled training data in each local data set. An example of this may be the optimisation of a model to identify alpha-numerical digits in different local data: in this case, the targets (the alpha-numerical digits) will have the same or very similar appearance across all local domains, and so the model can be trained to identify the same feature within target images. Therefore, the structure of models at a local client and a central sever are identical, and easily transferrable.

However, previously described federated learning techniques encounter problems where each local domain is independent (or non-overlapping). For example, non-overlapping data sets arise in visual data representing different person populations from different locations/cities. Here, certain descriptors (e.g. snow boots, gloves, or shorts, sandal) would not be observed in different local data sets, resulting in discrepancies in the class space for each local feature embedding model upon which the decentralised model should be based.

In view of these concerns, a new type of model is required, capable of generating an optimised domain-generalisable model for re-identification of a target, using a distributed collection of non-overlapping data sets.

SUMMARY OF THE INVENTION

There is described a new method for generating an optimised domain-generalisable model for zero-shot recognition or identification of a target (such as a person) in a set of candidate images (such as CCTV or other visual data). The new method is termed 'Federated Person Re-identification (FedReID)'. FedReID allows for a generalisable re-identification model to be generated at a central server via distributed collaborative learning of local feature embedding models (at local and private clients), without sharing of local data.

Federated Person Re-Identification (FedReID) uses local data associated with, and available to, each local client of a plurality of local clients in order to optimise a local feature embedding model at each client. A central server then selects and aggregates changes to each local feature embedding model to update and improve a centralised or global feature embedding model. The consequent updates to the centralised or global feature embedding model may then be 'fed-back' to each of the local feature embedding models, update and improve the model at each local client. Beneficially, the local clients identify specific portions of the updates to the global feature embedding model which are most relevant their respective local feature embedding model (via a mapping network), and apply those relevant updates accordingly. This exchange of client-server model updates communication is iteratively processed, enabling learning from decentralised data whilst maintaining opacity of the local data set to the decentralised model at the server.

Beneficially, for each iteration of the described method, updates from only a portion of the available local clients (and their associated local feature embedding models) are applied or extracted to the global feature embedding model (a process known as 'drop-out'). This prevents overfitting of the global feature embedding model.

Importantly in FedReID, local data sets do not share the same label space. Instead, the label space for each local data set (a domain) may be completely non-overlapped (independent) from any other local data set (domain). FedReID constructs a mechanism that enables to optimise a single global feature embedding model from different and independent (non-overlapping) collections of local label spaces. FedReID is also designed to allow learning of the local feature embedding models with no labelled training data for any target classes in each local data set.

In a further enhancement to FedReID, white noise can be applied to information representing the updates to each local feature embedding model prior to their aggregation and application within the global feature embedding model. This offers further privacy with respect to the local data sets, as it aids in the prevention of 'reverse engineering' to identify information about any given local data set.

Federated Person Re-identification (FedReID) as described herein allows for the learning of a global feature embedding model, for use in characterising generic and transferrable features in a data set. In out-of-the-box deployments at a new local domain (such as in a new city), the centralised model can be successfully downloaded and deployed without additional supervised learning.

Particular advantages may result for the use of FedReID, such as:

(i) Non-centralised learning: the presently described methods benefits from the optimisation of a neural network as a result of exposure to a large quantity of data in the form of a decentralised collection of independent local (small) data sets, without requiring sharing of these local data sets. The learning is federated (or decentralised) such that it does not rely on shared data and centralised big data, allowing the preservation of privacy and independency of local (small) data sets, even in out-of-the-box deployments.

(ii) No requirement for common class labels: the described method avoids a requirement for all local clients to share any class labels. In other words, the local clients are associated with completely independent domains, having a non-overlapping class label space. As an example, the local domains may be two cities in which CCTV images from those cites would be expected to have relatively little environmental or contextual overlap (e.g. people in London and people in Tokyo on a given day/week). In part, the success of the present method results from the provision of a domain-specific local feature embedding model at each local client, made possible by the use of a mapping network for extraction of relevant updates of the global feature embedding model to each local feature embedding model ("domain-specific knowledge"). In contrast, in the present method the global feature embedding model aggregates local updates to construct a generalised model for domain-generalised feature representation.

(iii) Ability for zero-shot re-identification: in the described method, the local client training data of non-target population classes has no overlap with the target (probe) population (classes) to be re-identified. The decentralised, global feature embedding model resulting from the described method allows for generic feature characterisation. As such, it can be used for zero-shot re-identification, i.e. no training data on the targets of interest, with all training data at each local client representing a general public population (independent gallery) at that local client.

(iv) Privacy control: the presently described method allows for iterative client-server collaborative learning with privacy protection control, without sharing of data in the overall model optimisation.

It should be noted that throughout this description of FedReID, the client is considered to relate to the local domain (for example, each local client hosting a local feature embedding model or neural network (or 'local model' or 'local network', and hosting or with access to a local data set associated with that domain). The central server is considered to relate to the global domain (virtual with no actual global training data), for example hosting the centralised global feature embedding model or network (or 'global model' or 'global network'), and to be in communication with each of the plurality of local clients. There is no requirement for the local clients to be in direct contact with each other.

In a first aspect there is described a method for generating a domain-generalisable model for re-identification of a target in a set of candidate images, comprising:

(a) optimising a local feature embedding model for domain-specific feature representation at each client of a plurality of clients, the local feature embedding model at each client of a plurality of clients optimised for a respective data set associated with a domain of each client of the plurality of clients;

(b) receiving, at a central server from each client of the plurality of clients, information on changes to the local feature embedding model at each respective client resulting from the optimising step;

(c) updating, at the central server, a global feature embedding model for domain-generalisable feature representation based on the changes to the local feature embedding model at each respective client of at least a subset of the plurality of clients;

(d) receiving, at each client of the plurality of clients from the central server, information representative of the updates to the global feature embedding model;

(e) mapping, at each client of the plurality of clients, on to the respective local feature embedding model, at least a portion of the received updates to the global feature embedding model;

(f) updating, at each client of the plurality of clients, the respective local feature embedding model based on the mapped updates; and repeating each of the steps (a) to (f) until convergence criteria are met for the optimisation of the local feature embedding model at each of the plurality of local clients, wherein the global feature embedding model is the optimised domain-generalisable model for re-identification of a target in a set of candidate images in any of the local clients that may have contributed to the global feature embedding model learning and any other local clients which did not contribute to the global feature embedding model learning.

The local and global feature embedding models may be considered as neural networks. The feature embedding networks may be based on, for example ResNet-50 networks (as described at https://arxiv.org/abs/1512.03385, retrieved 30 Jan. 2020). The networks and methods described may be applied to visual or audio data or text, for instance, although examples described here focus on image recognition and recognition of a visual target in visual data.

The method takes place on a system comprising at least a central server, in communication with a plurality (e.g. two or more) clients. The clients could be considered local servers. Each of the server and clients comprise processors configured to execute computer logic to carry out the steps of the described method. Each of the server and clients may include memory or data storage, or be in communication with external memory or storage.

A local feature embedding model (or local feature embedding network) is hosted and optimised at each client of the plurality of clients. In other words, each client hosts a separate and independent local feature embedding model. Each client is associated with a respective local feature embedding model. Each local feature embedding model is optimised for the characteristics of locally available data. As such, each local feature embedding model provides domain-specific knowledge, and may be especially successful at re-identifying targets with the associated local data.

A global feature embedding model is hosted at the central server. The global feature embedding model is updated and 'optimised' based on aggregate information related to changes or optimisation of each local feature embedding model. The global feature embedding model is not associated with any specific data set, nor optimised in relation to any specific data set. As such, the global feature embedding model provides domain-generalised knowledge. Although for any given data set, an optimised local feature embedding model will be typically more successful at re-identifying a target, the global feature embedding model may be applied for 'out-of-the-box' deployment for-identification of a target in unseen candidate data in unknown new domains (clients). Furthermore, a new client introduced to the plurality of clients may initially use the global feature embedding model as is associated local feature embedding model, before optimising said local feature embedding model according to the described method.

Preferably, the data set associated with a domain of each client is a data available locally to each client. The data set associated with each client is an independent, separate data set. Preferably, each independent data set is non-overlapping. In other words, the data set associated with each local client has no class label overlap with any other client. As such, it is independent in its class label space compared with any data set of another client from the plurality of clients. Furthermore, the data set associated with each local client does not require or assume class label overlap with the eventual target for re-identification. Thus, each data set can be considered a decentralised zero-shot learning data set.

For instance, each local client may be associated with a local data set consisting of CCTV images from a specific city or location. Such CCTV images may well have entirely different feature parameters or class label spaces (describing items of clothing, lighting, target backgrounds). Moreover, there may be no expectation that any common targets feature across each local data set. This type of independent data set—which will not be represented by common class label spaces—poses a particular problem for previously described federated learning methods, as described above. In particular, this problem arises because in this type of data there can be no assumption that common target characteristics will be visible in each local domain. This problem is in part overcome by the use of the mapping network within the presently described method.

Optionally, optimising a local feature embedding model for domain-specific feature representation at each client of a plurality of clients comprises repeating the optimisation of the local feature embedding model or network for a pre-defined number of rounds. In particular, the optimisation looks to reduce error in the output from the local network after n iterations, where n may represent a pre-defined proportion of input images from the local data set.

Information on changes to the local feature embedding model resulting from the optimisation step may be provided to the server as an update vector from each local client. Each update vector may provide the change to coefficients or weights of parameters at the respective local feature embedding model at the local client.

Updating of the global feature embedding model based on the changes to each local feature embedding model may comprise, for each iteration of the model, aggregating a subset of the update vectors received from the plurality of local clients. The global feature embedding model for feature representation is updated based on the changes to the local feature embedding model for at least a subset of the plurality of clients. In other words, the global feature model may be updated based on the changes at all the local feature embedding models or, more preferably, the changes at the local feature embedding models at only some of or a fraction of the plurality of clients. The selection or use of updates from only a fraction of the local feature embedding models is known as 'drop-out', and by adjusting the extent of drop-out (i.e. adjusting the fraction) can prevent overfitting of the global feature embedding model. Drop-out' is discussed further below. Overfitting is a well-known concept in art, wherein overfitting occurs if a statistical model corresponds too closely to a particular data set, such that the model contains more parameters, or is too complex, given the fitting data available (for example, see https://en.wikipedia.org/wiki/Overfitting, retrieved 30 Jan. 2020).

Mapping at least a portion of the received updates to the global feature embedding model on to the local feature embedding model at each client allows for changes to the global feature embedding model which are considered to have the greatest relevance to the class label space at the respective local client to be incorporated into the local client embedding model. The mapping determines the relevant domain-generalisable knowledge within the global feature embedding model, and extracts and aligns this is with the local feature embedding model. For example, only updates to the aspects of the feature space overlapping between the global and the local feature embedding models will be transferred to the local feature embedding model from the global feature embedding model. The mapping process is performed by consideration of the divergence between the competing local and global feature embedding models applied to the local data set. This is discussed further below.

Once the mapping step is complete, the method requires the local feature embedding model to be updated based on only the relevant changes to the global feature embedding model. As such, the local feature embedding model incorporates both the domain-specific knowledge of the domain local to the client, but also incorporates the domain-generalised knowledge from the global feature embedding model. This is in contrast to prior art federated learning methods, where an updated global feature embedding model is typically used to replace a local feature embedding model, thus losing domain-specific optimisation.

The steps of the method described (optimising and updating the local feature embedding model and updating the global feature embedding model) will continue iteratively until convergence criteria (or an optimisation objective) at each local feature embedding model is met. In other words, the iterative process will continue until the local feature embedding model at every client of the plurality of clients is fully optimised with respect to the data available locally to each respective client. The global feature embedding model is then also considered to be optimised, and so can be deployed as an optimised domain-generalisable model for re-identification of a target in a set of candidate images.

Preferably, updating the global feature embedding model based on the changes to at least a subset of the local feature embedding model at each respective client, comprises:

selecting a subset of the plurality of clients;

aggregating, at the central server, the information on changes to the local feature embedding model received from each client of the selected subset of the plurality of client to determine the aggregate changes; and updating the global feature embedding model based on the aggregate changes.

The subset of the plurality of client may be a predetermined fraction of the plurality of clients, the changes to the local feature embedding model of which are applied to the global feature embedding model at the server. For instance, changes at the local feature embedding model of 50% of the clients may be applied, or alternatively changes at the local feature embedding model of 40%, 30% or 25% of the clients may be applied. The clients forming part of the subset of the plurality of clients may be selected at random.

Preferably, the information on changes to the local feature embedding model at each respective client comprises a vector set of values representing changes to the coefficient or weightings to a set of parameters of the local feature embedding model (which is a function or network). Aggregating the selected information requires combining the updates across the identified subset of the plurality of clients, in order for the completed updates to be incorporated into the global feature embedding model. Preferably, aggregating the selected information, comprises averaging the information on changes to the local feature embedding model received from each client of the selected subset of the plurality of clients.

Although in the FedReID method the locally available data set is not shared, additional privacy protection for the local data can be advantageously applied. In particular, prior to aggregating the selected information, the method may further comprise applying white noise to the information on changes to the local feature embedding model at each respective client of the selected subset of the plurality of clients. Adding white noise to the information on the changes to local feature embedding model reduces the ability to derive information on the local feature embedding model and local data by inverse analysis.

The contribution of the added white noise may be scaled by a pre-defined factor for each local client. This controls the effect of the white noise on the centralised aggregation. This in turn changes the transparency of the contribution of each local feature embedding model to the aggregation and to the updates to the global feature embedding model.

Preferably, receiving, at each client of the plurality of clients from the central server, information on the updates to the global feature embedding model comprises receiving, at each client of the plurality of clients from the central server, the global feature embedding model. In particular, privacy of the local data of each local feature embedding model is preserved by providing only information on the updates to the local feature embedding model after each iteration to the global feature embedding model. However, as the global feature embedding model is decentralised and does not relate to any specific data set which requires privacy protection, the global feature embedding model as such (i.e. not just the update or changes to the global feature embedding model) can be passed from the server to the client without sacrificing privacy or breaching data protection rules.

Mapping of at least a portion of the received updates to the global feature embedding model on to the local feature embedding model at each respective client was discussed above. More specifically, mapping at least a portion of the received updates to the global feature embedding model at each client of the plurality of clients on to the respective local feature embedding model, may comprise:
  determining, at each local client of the plurality of clients, a probability distribution for the respective local feature embedding model applied to the data set associated with a domain of the respective client;
  determining, at each local client of the plurality of clients, a probability distribution for the global feature embedding model applied to the data set associated with a domain of the respective client;
  determining, at each local client of the plurality of clients, a divergence between the probability distribution for the respective local feature embedding model and the probability distribution for the global feature embedding model;
  based on the results of the divergence, identifying, at each local client of the plurality of clients, the updates to the global feature embedding model that are relevant to the respective local feature embedding model; and
  updating, at each local client of the plurality of clients, the respective local feature embedding model based on the identified relevant updates to the global feature embedding model. In one example, Multi-layer Perceptron (MLP) with two fully connected layers can be employed as the mapping network (see https://en.wikipedia.org/wiki/Multilayer perceptron, for example, retrieved 30 Jan. 2020). The Kullback-Leibler divergence or relative entropy (see, for instance, https://en.wikipedia.org/wiki/Kullback-Leibler divergence, retrieved 30 Jan. 2020) can be calculated between the probability distribution for the respective local feature embedding model and the probability distribution for the global feature embedding model when applied to the local data set of the respective local client.

A significant advantage of the described FedReID method is the ability for deployment of the method 'out-of-the-box' for re-identification of a target in unseen data. In particular, once the steps of the method have been repeated until convergence criteria have been met at all local feature embedding models, it can be assumed that the global feature embedding model at the central server has also been optimised. Global feature embedding model can then be applied as a domain-generalisable model for re-identification of a target in a set of candidate images in unknown new domains. More specifically, the method may further comprise applying, at a client of the plurality of clients, the optimised local feature embedding model to characterise a target as a local feature vector; and
  using said local feature vector to identify one or more instances of the target in the data available locally to the said client of the plurality of clients.

It is noted that the optimised local feature embedding model at each local client may also be successfully applied to the locally available data set, in order to re-identify a target within that particular data set. However, the global feature embedding model provides a better generalisable model for characterisation of generic features in unseen data.

Optionally, the method may further comprise;
  introducing a further client to the plurality of clients;
  setting the local feature embedding model at the further client as a global feature embedding model; and
  repeating each of the steps of the method (e.g. steps (a) to (f)) until the convergence criteria are met for the optimisation of the local feature embedding model at each of the plurality of local clients, including the further client.

In a second aspect there is a system for generating an optimised domain-generalisable model for re-identification of a target in a set of candidate images, comprising:
  a central server, hosting a global feature embedding model for domain-generalisable feature representation;
  a plurality of clients, each client hosting a local feature embedding model for domain-specific feature representation, each client of the plurality of clients having access to a respective data set associated with a domain of each client of the plurality of clients;
  wherein the central server and each of the clients of the plurality of clients are configured to together perform the steps of the method outlined above.

In a third aspect there is a system for generating an optimised domain-generalisable model for re-identification of a target in a set of candidate images, comprising:
  a central server, hosting a global feature embedding model for domain-generalisable feature representation;
  a plurality of clients, each client hosting a local feature embedding model for domain-specific feature representation, each client of the plurality of clients having access to a respective data set associated with a domain of each client of the plurality of clients;
  the central server being configured to:

receive, from each client of the plurality of clients, information on changes to the local feature embedding model at each respective client;
update the global feature embedding model for feature representation, based on the changes to the local feature embedding model at each respective client of at least a subset of the plurality of clients;
send, to each of the clients of the plurality of clients, information representative of the updates to the global feature embedding model; and each client of the plurality of clients being configured to:
optimise the local feature embedding model for the respective data set associated with the domain of each client of the plurality of clients;
send, to the central server, information on changes to the local feature embedding model;
receive, from the central server, information representative of the updates to the global feature embedding model;
map on to the local feature embedding model, at least a portion of the received updates to the global feature embedding model;
update the local feature embedding model based on the mapped updates.

Preferably, the respective data set associated with a domain of each client of the plurality of clients is an independent data set.

Preferably, the central server being configured to update the global feature embedding model based on the changes to at least a subset of the local feature embedding model at each respective client, comprises the central server being configured to:
select a subset of the plurality of clients;
aggregate the information on changes to the local feature embedding model received from each client of the selected subset of the plurality of client to determine the aggregate changes; and
update the global feature embedding model based on the aggregate changes.

Preferably, the central server being configured to aggregate the selected information comprises the central server being configured to average the information on changes to the local feature embedding model received from each client of the selected subset of the plurality of clients.

Preferably, each of the local clients is further configured to apply white noise to the information on changes to the local feature embedding model, prior to sending to the central server.

Optionally, the contribution of the added white noise to the aggregation is scaled by a pre-defined factor for each local client.

Preferably, each client of the plurality of clients being configured to receive, from the central server, information representative of the updates to the global feature embedding model comprises each client of the plurality of clients being configured to receive the global feature embedding model.

Preferably, each client of the plurality of clients being configured to map on to the local feature embedding model, at least a portion of the received updates to the global feature embedding model, comprises each client of the plurality of clients being configured to:
determine a probability distribution for the respective local feature embedding model applied to the data set associated with a domain of the respective client;
determine a probability distribution for the global feature embedding model applied to the data set associated with a domain of the respective client;
determine a divergence between the probability distribution for the respective local feature embedding model and the probability distribution for the global feature embedding model;
based on the determined divergence, identify the updates to the global feature embedding model that are relevant to the local feature embedding model; and
update the local feature embedding model based on the identified relevant updates to the global feature embedding model.

Preferably, the central server is further configured to:
deploy the global feature embedding model to a customer client;
wherein the customer client is configured to:
apply the global feature embedding model to characterise a target;
apply the global feature embedding model to characterise each image of a set of candidate images associated with the domain of the customer client; and
use a distance metric to identify the candidate images having greatest similarity to the target image. The distance metric could for example be the Euclidian distance, or the Cosine distance, or the Mahalanobis distance, or the Hamming distance.

BRIEF DESCRIPTION OF THE DRAWINGS

The disclosure may be put into practice in a number of ways and preferred embodiments will now be described by way of example only and with reference to the accompanying drawings, in which.

In the drawings, like parts are denoted by like references numerals where appropriate. The drawings are not drawn to scale.

DETAILED DESCRIPTION OF PREFERRED EMBODIMENTS OF THE INVENTION

Figure 1:
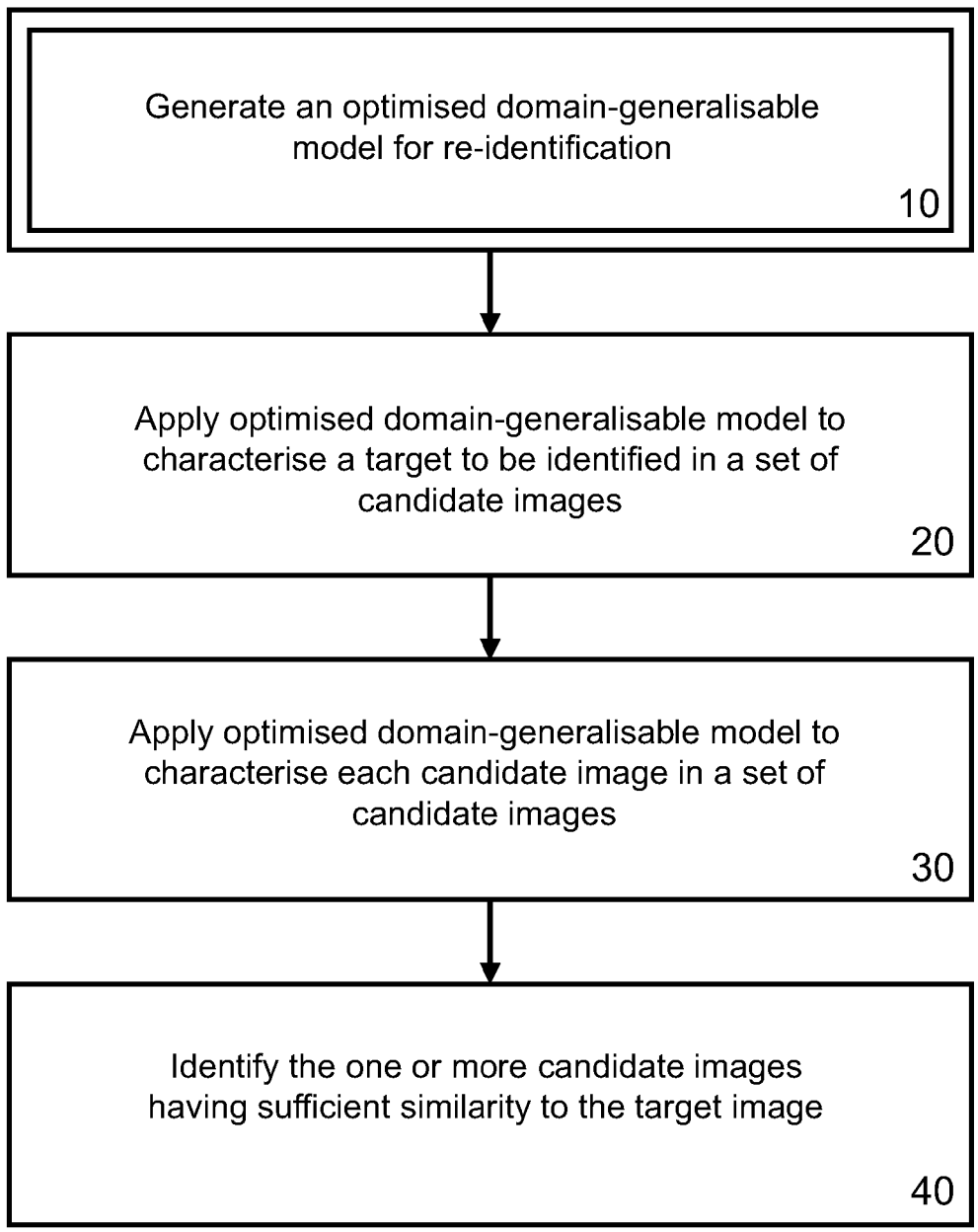
FIG. 1 shows a flow diagram for the steps for use of an optimised domain-generalisable model for re-identification of a target in a set of candidate images.

The invention is concerned with person identification or recognition as a result of decentralised zero-shot learning, and more specifically generation of a model for identification of a target (or person) in a set of candidate images (such as a set of CCTV images). In particular, the method looks to provide a model (or neural network) which could be used to identify within a gallery of images a target (for example, an image of a particular person in a set of CCTV data). The method makes use of feature embedding models (or feature embedding neural networks), which are discussed in more detail below.

Computational person re-identification has to overcome a number of problems. For instance, targets within CCTV images may present with different levels of occlusion, at different perspectives, may be illuminated in different ways between images, or may be observed in images of different resolutions of images taken at different cameras. Other difficulties may arise by changes in aspects of a target's appearance over time (for instance, due to a change of clothing), or from the target being clothed in a uniform and so presenting a less distinguishable appearance compared to other people in the image gallery. As such, person re-identification, which seems a simple task for a human operator, is a highly complex problem for a computer algorithm or model. It requires consistent labelling of a feature space across images, so as to be able to provide an ID according to a set of stable descriptors to allow for comparison. The method described here presents an active (machine learning) method of developing a domain-generalisable model (or network) for re-identification of a target.

Feature Embedding Models as a Neural Network

As will be understood by the skilled person, images can be represented as vectors in a feature space. In an example, the vectors may represent RGB values for each pixel within an image. By optimisation of a feature embedding model, descriptors (e.g. representative vectors) for images of identifying characteristics of subjects within test data can be learned. A feature embedding model or network is designed to accurately transform an image to the feature space, in order to characterise an image with suitable descriptors.

The feature embedding model is a neural network. By way of background, a neural network is essentially a set of algorithms designed to recognise patterns contained in numerical vectors. For instance, a feature embedding model is a neural network designed to recognise reoccurring features in a set of vectors representing a gallery of images, in order to identify patterns representative of specific persons or objects within the images.

More specifically, a neural network maps an input to an output. It can be considered as a "universal approximator" and effectively provides a function representing a generalisable correlation between a given input to a given output. Optimisation of the network improves the approximation provided by the function, to provide a more accurate output for a given input. The function includes a number of components, each of which are weighted (in other words, having a related coefficient). Optimisation of the network takes place by adjusting the weights (or coefficients) of components of the model to minimise error observed as a result of comparison of an output to the network for a given input, compared to a known or expected output. In this way, the network is optimised on training data, to provide the required known outputs. The process adjustment of the weights in the model to reduce error can take place by gradient descent, for example.

Federated Person Re-Identification

A feature embedding model or network essentially generates a vector or measure for comparison of features in a target image and features in a set of image data in which the target is to be identified. The particular innovation of the method and system described herein relates to the process of optimisation of a feature embedding model (or network), in order for that model or network to be applied for re-identification of a target within a data set. For context, FIG. 1 shows the steps of a process, of which the presently described invention is a part, which could be used for re-identification.

In particular, an optimised domain-generalisable model is generated (step 10) according to the method described in detail below, and which is the focus of this invention. Upon generation of the optimised domain-generalisable model, the model can be deployed for re-identification of a target in new, unseen candidate data. In particular, the optimised domain-generalisable model or network can be applied to characterise the target (step 20). In other words, the optimised domain-generalisable model can be used to generate a vector characterising the target (or person to be identified) in feature label space.

Subsequently, the optimised domain-generalisable model can be applied to characterise each candidate image in a data set from which the target is to be re-identified (step 30). For instance, the data set may be a set of CCTV images, and each image of the set of CCTV images may be characterised as a vector of descriptors in feature label space, via the optimised domain-generalisable model.

The vectors of descriptors representing the target image and the candidate images may be compared, in order to identify the candidate images having greatest similarity with the target image (step 40). For example, linear regression techniques may be used to calculate the similarity between the target image and at least portions of each candidate images. Those candidate images having a similarity measure greater than a predefined threshold are considered to be a likely match to the target (i.e. the target is re-identified in the candidate image).

Figure 2:
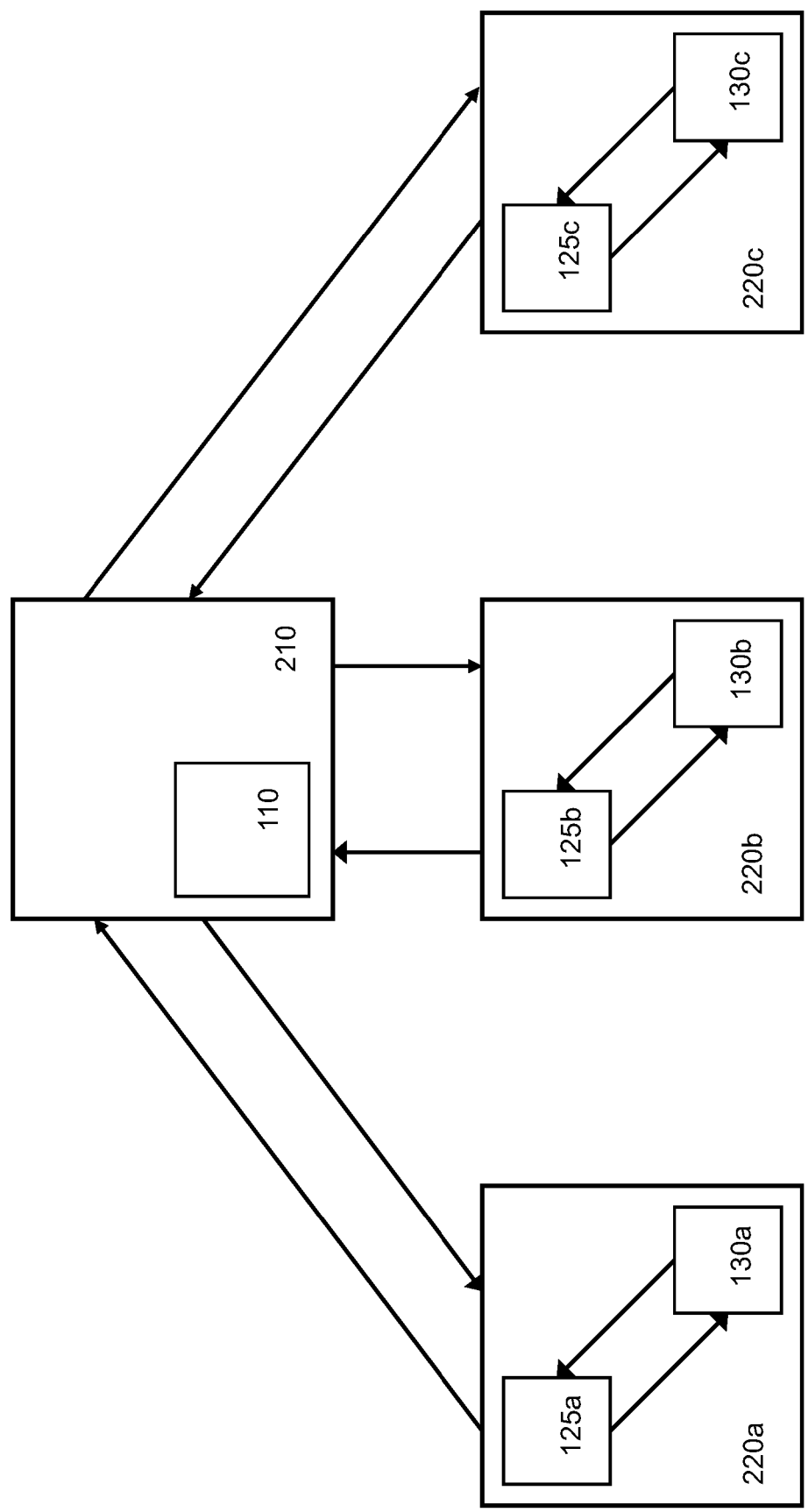
FIG. 2 is a schematic diagram of the system comprising a central server and a plurality of local clients.

The process of generation of an optimised domain-generalisable model (step 10 of FIG. 1) is the main subject of the present invention, and will now be considered in more detail. FIG. 2 shows the configuration of a system upon which this process will take place. A plurality of local clients 220a, 220b, 220c are provided, in two-way communication with a central server 210. The central server 210 comprises at least a processor 110, and may further comprise memory or data storage. Each local client comprises a processor 125a, 125b, 125c and associated data storage or memory 130a, 130b, 130c. The associated data storage may form part of the local client, or alternatively may be in direct communication with (but geographically remote from) the local client.

Figure 3:
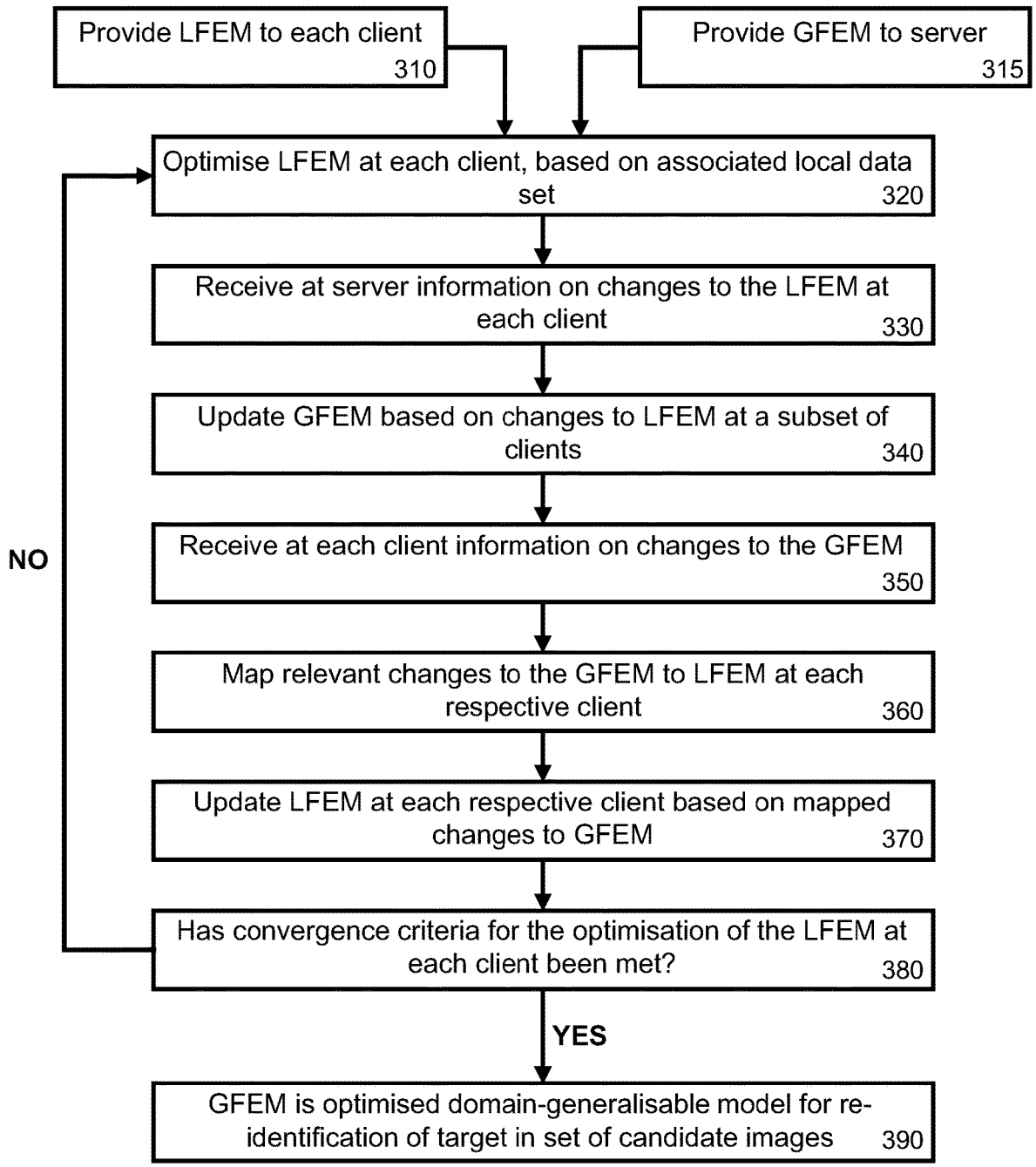
FIG. 3 is a flow diagram for the steps of the method for generating an optimised domain-generalisable model for re-identification of a target in a set of candidate images.
Figure 4:
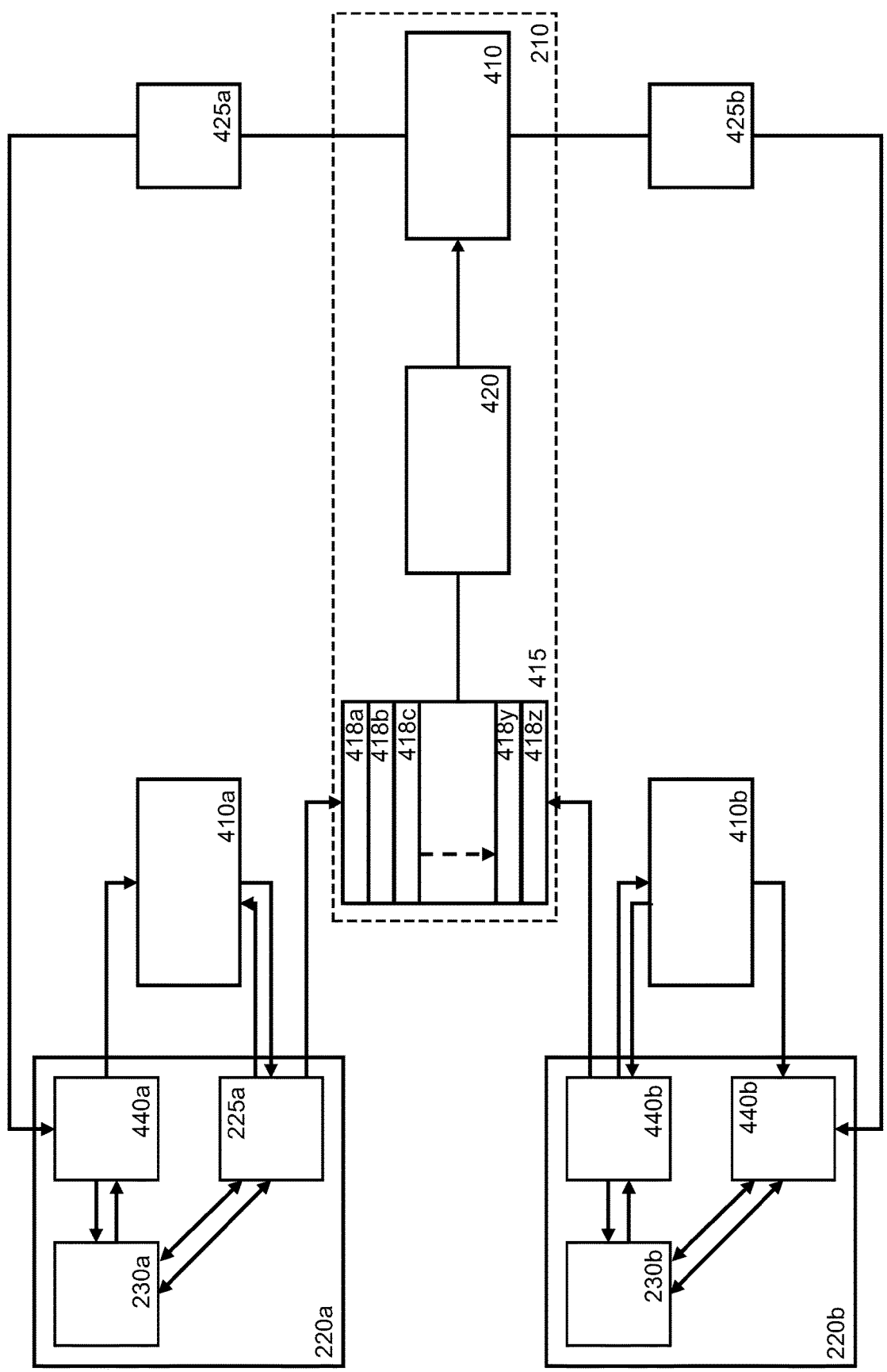
FIG. 4 is a schematic diagram showing the system and interaction between portions of the system according to the method of FIG. 3.

FIG. 3 is a flow diagram showing the steps of the method taking place at the system of FIG. 2, in order to generate an optimised domain-generalisable model for re-identification of a target in a set of candidate images, according to an embodiment of the present invention. FIG. 4 shows a schematic example of the system according to an embodiment of the invention, and in particular the exchange of data between components of the system.

A local feature embedding model, LFEM, 225a, 225b is provided to each local client 220a, 220b of the plurality of clients (step 310). A global feature embedding model, GFEM, 410 is provided to the central server 210 (step 315). Prior to any optimisation, each local feature embedding model 225a, 225b and the global feature embedding model 410 may be a predetermined initialised function (or initialised network). In other cases, for instance where a new local client is added to an existing system, the local feature embedding model at the new local client may be initialised to be the same as the global feature embedding model, as received or downloaded from the central server.

The method may then proceed as follows:

Step 320: At each local client 220a, 220b, the local feature embedding model 225a, 225b is optimised based on the associated local data set 230a, 230b. The associated local data set 230a, 230b may be a training data set relevant to the geographical domain with which the particular local client 220a, 220b is associated. The local data set 230a, 230b may be stored in memory at the local client 220a, 220b, or may be stored remotely from the local client 220a, 220b but accessible by it.

The process of optimising the local feature embedding model 225a, 225b will be understood to use known techniques for optimising a neural network. For instance, the local feature embedding model 225a, 225b will be used to reconstruct an input image from the local training data set 230a, 230b, and then compare the reconstructed image to the 'real' input image. The weightings for each component of the local feature embedding model (or network) 225a, 225b can then be adjusted, in order to reduce the error between the reconstructed and 'real' image (for example, using gradient descent, or other techniques).

Said optimisation may be iterated a predetermined number of times before moving to step 330.

For further discussion, see section 'Overview' in Annex below, and in particular discussion in relation to Equations 1, 2 and 3.

Step 330: Information 415 relating to changes to each local feature embedding model 225a, 225b at each local client 220a, 220b and resulting from the optimisation step 320 is passed to the central server 210. The information 415 may be provided as a set of vectors 418a-f, each vector representative of the changes to the local feature embedding model 225a, 225b at a local client 220a, 220b. The local feature embedding model 225a, 225b itself is not transferred to the server 210, as this could compromise the privacy of the local data 230a, 230b at each client 220a, 220b.

Step 340: The information 415 on changes to the local feature embedding model 225a, 225b at two or more clients 220a, 220b is aggregated 420 and then applied to (or incorporated into) the global feature embedding model 410. In this way, the global feature embedding model 410 is updated based on the changes to the local feature embedding model 225a, 225b at two or more local clients 220a, 220b.

Advantageously, only changes from the local feature embedding model 225a, 225b at a portion (two or more) of the plurality of local clients is incorporated into the global feature embedding model 410 at any one time. This is to prevent overfitting.

Further discussion of the aggregation 420 of the changes to the local feature embedding model 225a, 225b at two or more local clients 220a, 220b and the prevention of overfitting is provided below. In addition, see section 'Client-Server Iterative Updates' in Annex below, and in particular discussion in relation to Equation 5.

Step 350: Information representative of the changes 425a, 425b to the global feature embedding model 410, resulting from the aggregate of changes at two or more local clients 220a, 220b, are communicated to each local client 220a, 220b. All the local clients 220a, 220b of the plurality of local clients will receive information representative of changes 425a, 425b to the global feature embedding model 410, irrespective of whether the changes from a particular local client 220a was incorporated into the global feature embedding model 410 at step 340.

In some examples, the information representative of changes 425a, 425b to the global feature embedding model 410 will be a vector representative of the differences between the present global feature embedding model and the previous iteration of the global feature embedding model. In other preferred examples, the global feature embedding model 410 itself may be provided to each local client 220a, 220b and stored therein 440a, 440b. Due to the fact that changes to the global feature embedding model 410 result from the aggregation 420 of previous changes to two or more local feature embedding models 225a, 225b, the changes 425a, 425b to the global feature embedding model 410 as provided to each local client 220a, 220b cannot be used to identify characteristics of the local data set 230a, 230b associated any particular local client 220a, 220b. Thus, privacy of the data sets 230a, 230b associated with each local client 220a, 220b are maintained.

Step 360: Changes to the global feature embedding model 410 are mapped onto the respective local feature embedding model 225a, 225b at each local client 220a, 220b of the plurality of clients via a mapping network 410a, 410b. Considering each of the local 225a, 225b and global 410 feature embedding models or networks to be a function of weighted components, it will be understood that not all components are present in both the local 225a, 225b and the global 410 models. As such, each local client 220a, 220b uses a respective mapping network 410a, 410b to map the changes to components of the global feature embedding model 410 on to common components within the respective local feature embedding model 225a, 225b. Therefore, only changes to the domain-generalised global feature embedding model 410 that are relevant to the domain-specific local feature embedding model 225a, 225b are transferred at step 370.

Further detail of the mapping process is provided below, together with sections 'FedReID Client-server Collaboration' and 'Optimisation Objective' in the Annex, and in particular discussion in relation to Equations 10, 11 and 12.

Step 370: At each local client 220a, 220b, the respective local feature embedding model 225a, 225b is updated according to the mapped changes at the global feature embedding model 410. For instance, the weighted components identified at mapping step 360 via mapping network 410a, 410b as being present in both the respective local feature embedding models 225a, 225b and the global feature embedding model 410 are updated according to the changes to the global feature embedding model 410.

Step 380: Steps 320 to 370 are repeated or iterated until convergence criteria at each local feature embedding model 225a, 225b of the plurality of local feature embedding models are met. The relevant convergence criteria (and objective function) are discussed in more detail below.

Step 390: In the event that the convergence criteria are met for each local feature embedding model 225a,

225b at each local client 220a, 220b, then the local feature embedding models at each local client are considered optimised. As a consequence, the global feature embedding model can also be considered optimised, and deployed as the optimised domain-generalisable model for re-identification of a target in a set of candidate images. For instance, the final, optimised version of the global feature embedding model can be used to identify a target within a gallery of candidate images according to the steps 20, 30 and 40 described in relation to FIG. 1.

Aspects of a number of steps of the process illustrated in FIGS. 3 and 4 are now described in further detail.

Aggregation of Updates to a Portion of the Local Feature Embedding Models (i.e. 'Drop Out') (Step 340 of FIG. 3)

A problem inherent in the process of optimisation of a neural network is overfitting. In particular a model becomes over-fitted if it corresponds too closely or exactly to a specific (training) dataset, thereby losing some ability to universally approximate an unseen dataset. To avoid overfitting, the present method incorporates changes at only a portion of the local feature embedding models when updating the global feature embedding model. The specific local feature embedding models 'chosen' to be within the portion used to update the global feature embedding model will be selected at random for each iteration of the method. By this means, the update to the global feature embedding model (which subsequently results in updates to the local feature embedding models and consequent optimisation of the local feature embedding models) is influenced by a different set of local data sets at each iteration. Accordingly, the global feature embedding model is forced to be a universal approximation across all local datasets.

The specific portion or fraction of the plurality of local clients which may be aggregated for update to the global feature embedding model may be varied. In a specific example, a portion of around 50% was used in each iteration.

Mapping Updates to the Global Feature Embedding Model on to Each Local Feature Embedding Model (Step 360 of FIG. 3)

Mapping may take place by calculation of a soft probability distribution by applying the present local feature embedding model and by applying the received, updated global feature embedding model to the local data set at each local client. The divergence between the two probability distributions (resulting from the local feature embedding model and from the global feature embedding model) can then be obtained. From this measure of divergence, the weighted components of the domain-generalised global feature embedding model that are most relevant to the domain-specific local feature embedding model can be identified. The identified relevant (or 'mapped') weightings can then be used to update the given local feature embedding model.

Effectively, at this step for each client the local feature embedding model and the global feature embedding model operate as competing networks. The attributes of the model with greatest similarity and difference are compared, in order to determine appropriate updates to the local feature embedding model.

For further discussion, see sections 'FedReID Client-server Collaboration' and 'Optimisation Objective' in Annex below, and in particular discussion in relation to Equations 10, 11 and 12.

Convergence Criteria for Conclusion of Iteration (Step 380 of FIG. 3)

The method looks to provide an optimised domain-generalisable model for deployment for person re-identification.

As the global feature embedding model is not itself applied to a training data set, it instead relies upon the full optimisation of each local feature embedding model on each local dataset. The local feature embedding model is considered fully optimised for domain-specific feature extraction when certain convergence criteria are met for the local feature embedding model on the local, training data sets. Thus, the global feature embedding model is only optimised when every local feature embedding model of a set of N models at a plurality of N local clients is optimised beyond a predetermined level. At this time, no further iterations of the described method are required, and the global feature embedding model may be deployed for person re-identification on an unseen data set. As such that the global feature embedding model provides centralised and domain-generalisable feature extraction from an 'effective' large data set provided by the combination of each local data set, without sharing of those local data sets.

It is noted that if additional local clients are added to the plurality of local clients, the method should be repeated until any local feature embedding models at any new local clients are also optimised. When a new local client is added to the plurality of clients, the local feature embedding model at the new client may initially be set as equal to the global feature embedding model.

Privacy Protection

In an advantageous embodiment a further feature of the method may be employed—privacy protection. As will be understood by the person skilled in the art, the method described above in relation to FIG. 3 already achieves a level of privacy for each local data set: in particular, the local data sets are not shared, and only changes to the local feature embedding models are shared with the server. This meets with current data protection requirements, for instance. Moreover, updates to the global feature embedding model (which are shared with all clients) are a result of an aggregation of changes to just a portion of the plurality of local feature embedding model. Thus, knowledge of the update to the global feature embedding model cannot be used to obtain information about the content of any specific local data set. Nevertheless, a further technique may be applied within the described method, in order to further improve privacy and opacity of the local data sets.

In particular, 'white noise' may be added or applied to the information 415 relating to changes to each local feature embedding model at step 330. For example, the vector representing said changes could be multiplied by a white noise function prior to communication from the local client to the server. In this way, the specific changes to the local feature embedding model as a result of the optimisation will not be distinguishable when the information 415 is received at the central server. Thus, information on the local data set cannot be obtained at the central server by reversing the changes to the local feature embedding model compared to a previous iteration. As such, the privacy of the local data set is further improved.

For further discussion, see section 'Privacy Protection' in Annex below, and in particular discussion in relation to Equation 13.

Annex—Federated Person Re-Identification

The following provides further description and specific examples of the context for the described method, the methodology and mathematical background for the described method, and the examples of the application of the method. References within this description are listed at the end of the annex.

Deep learning has undoubtedly achieved incredible success in many computer vision tasks, given the availability of more shared and centralised large sized training data. However, increasing awareness of privacy concerns poses new challenges to deep learning, especially for human subject related recognition such as person re-identification (Re-ID). This work addresses the person Re-ID problem by decentralised model learning from distributed and non-shared training data. Different from existing centralised shared data training paradigms, a fundamentally novel paradigm is proposed termed Federated Person Re-Identification (FedReID) capable of producing a generalisable Re-ID model (a centralised server) through collaborative learning of private local models (localised and private clients) without sharing training data. Each localised client consists of a feature embedding deep network for visual feature extraction and a mapping deep network for domain-specific knowledge learning, while the centralised server selects and aggregates local updates to construct a feature embedding model for domain-generalisable feature representation. By iterative collaborative learning between local clients and the central server, FedReID optimises a generalised model for out-of-the-box deployments without local data sharing therefore inherently protecting privacy. Extensive experiments show the effectiveness of this new FedReID model against the state-of-the-art Re-ID methods from using 11 Re-ID and person search evaluation datasets.

1. Introduction

In recent years, deep neural network learning has achieved incredible success in many computer vision tasks. However, it relies heavily upon two assumptions: (1) A large volume of data can be collected from multi-source domains, stored on a centralised database for model training; (2) Human resources are available for exhaustive manual labelling of training data. Despite the current significant focus on centralised data centres to facilitate big data machine learning drawing from shared data collections, the world is moving increasingly towards localised and private (not-shared) distributed data analysis at-the-edge. This differs inherently from the current assumption of ever-increasing availability of centralised labelled data and poses new challenges to deep learning, especially for human subject related recognition such as person re-identification (Re-ID) [10]. For concrete demonstration, the Re-ID problem is targeted.

Person re-identification on urban streets at city-wide scales is useful in smart city design (e.g. population flow management) and for public safety (e.g. find a missing person) [7, 43, 38, 31]. Most existing methods follow either (1) supervised learning paradigms [21, 33, 37] by collecting large-scale datasets for model training, or (2) unsupervised cross-domain paradigms [43, 44, 35] by pre-training a model in labelled source domains and fine-tuning in unlabelled target domains. Although these labelled data centralised learning paradigms achieve promising results, they face some significant problems: (1) How to train a model when source domain data cannot be shared to a centralised model training process due to privacy concerns and data protection requirements; (2) How to optimise a single generic model for out-of-the-box deployments without collecting training data (labelled or unlabelled) in target domains. This requires a new kind of person Re-ID paradigm capable of learning a generalisable deep model from distributed collection of non-sharing data.

Figure 5:
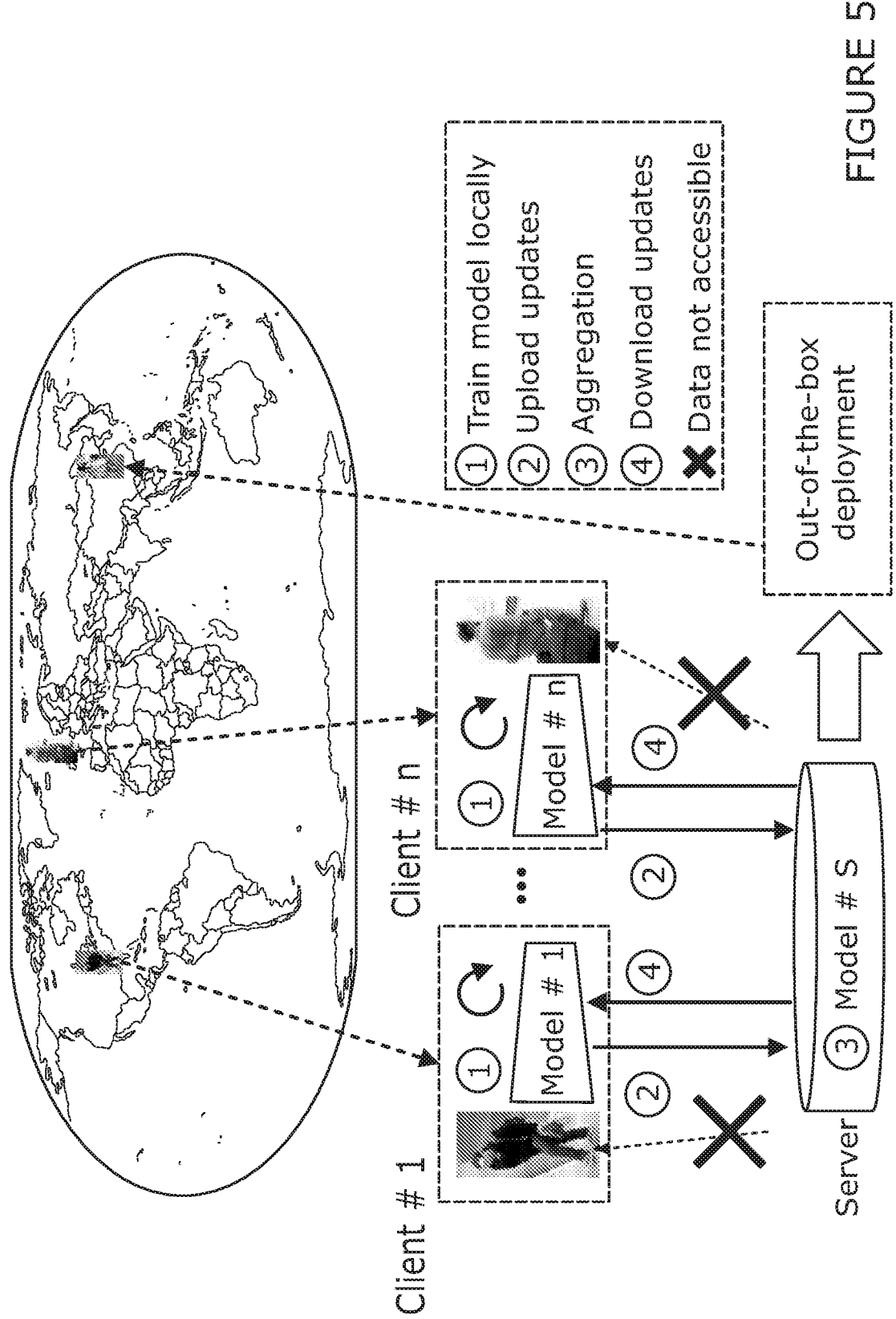
FIG. 5 is a representation of the described Federated Person Re-Identification (FedReID)

Here, there is proposed a fundamentally novel paradigm termed Federated Person Re-Identification (FedReID). The aim is to optimise a generalisable Re-ID model (a centralised server) with distributed collaborative learning of local models (localised and private clients) with non-sharing local data, so to facilitate effective out-of-the-box model deployments. As shown in FIG. 5, different cities around the world can play the roles of localised and private clients, which use local non-shared datasets for local model training. A centralised server selects and aggregates local model updates to construct a generalisable model without the need to access local data. Conversely, local clients can benefit from the central server updates which embed collective knowledge through feature representation (not data) from all local clients in order to improve each local client update individually. This client-server update communication is iteratively processed, enabling learning from decentralised data and privacy protection. For deployment in a new city, the generalised Re-ID model can be downloaded from the centralised server for direct deployments. As depicted in FIG. 5, each client uses sensitive (private) local data to train a localised model, while the server aggregates a centralised model without accessing the local data, enabling learning generic features with privacy protection. In out-of-the-box deployments, only the centralised model is distributed.

The contributions are: (I) A new paradigm termed Federated Person Re-Identification (FedReID) is proposed, designed for distributed model training on de-centralised non-sharing data suitable for preserving privacy in out-of-the-box model deployments. To the inventor's best knowledge, this is for the first time decentralised model learning on distributed non-sharing data is introduced for person Re-ID. The approach explores the principle of conventional federated learning [18] but is fundamentally different in model formulation due to the unique challenge of zero-shot learning in Re-ID. The proposed paradigm can benefit other computer vision tasks that also require decentralised zero-shot model learning on distributed non-sharing data. (II) In FedReID, conventional federated learning [25] is reformulated for optimising a generalised model from multiple domains of completely independent class label spaces. Each localised client consists of a feature embedding network for visual feature extraction and a mapping network for domain-specific knowledge learning, while the centralised server selects and aggregates local updates to construct a generalised model for domain-generalised feature representation. (III) Iterative client-server collaborative learning with privacy protection control is introduced, without sharing data in overall model optimisation.

Extensive validation has been conducted by utilising 10 Re-ID datasets (Market-1501 [47], DukeMTMC-ReID [49], CUHK03 [20], MSMT17 [36], VIPeR [11], iLIDS [48], 3DPeS [3], CAVIAR [5], PRID [14] and GRID [23]), plus the CUHK-SYSU person search dataset [40]. Experimental results show the effectiveness of FedReID against the state-of-the-art Re-ID methods.

2. Related Work

Federated Learning: Federated learning [18, 25, 42, 9] is a recently proposed machine learning technique that allows local users to collaboratively train a centralised model without sharing local data. Existing federated learning aims at learning a shared model with decentralised data for the same class label space (the same domain), although the distributions of local data may be different. Therefore, the model structures of each client and the server are identical.

McMahan et al. [25] introduced Federated Stochastic Gradient De-scent (FedSGD) and Federated Average (FedAVG) to iteratively aggregate a shared model by averaging local updates, which is effective in language modelling and digit recognition (all the local clients are learning the same domain of identical labels). FedReID, presented here, shares the merit of federated learning [18, 25] but requires a fundamentally different formulation for person Re-ID. In person Re-ID, each local domain is completely independent (non-overlapping) from the other domains with totally different person populations (ID space) from different locations/cities, resulting in domain discrepancies in ID space and context. Thus, there is a need to model simultaneously the non-sharing domain-specific knowledge of each localised client and the latent shared domain-generalised knowledge of the centralised server. In FedReID, each client consists of a feature embedding net-work for visual feature extraction and a mapping network for domain-specific knowledge learning, while the server constructs a domain-generalised model.

Person Re-Identification: Learning robust generic feature representations is attractive for Re-ID deployments across domains. Conventional supervised Re-ID [21, 33, 37] relies heavily on labelled training data in each target domain, whilst cross-domain unsupervised Re-ID [43, 44, 35] still relies on the availability of unlabelled data in the target domain for fine-tuning so they are impractical for out-of-the-box deployments. Domain generalised Re-ID models aim to learn a generic feature representation by collecting training data from multiple domains. Song et al. [31] design a domain-invariant mapping network by meta-learning. Xiao et al. [39] use domain guided drop out to select domain-specific neurons in a CNN trained on multiple domains. However, these methods require a centralised training process by assembling a large pool of data from multi-domain labelled datasets, which may not be feasible in practice due to privacy restrictions. Different from all existing Re-ID methods, FedReID, presented here, has a fundamentally different paradigm for optimising a generalised Re-ID model through collaborative learning by communicating knowledge representations among the server and the local clients. Each client learns independently on distributed local private data without centrally shared large training data, so FedReID embraces inherently privacy protection.

Distributed Deep Learning: FedReID differs significantly from conventional distributed deep learning [24, 6, 16]. Distributed deep learning aims at training very large-scale deep networks (over billions of parameters) using massive hardware involving tens of thousands of CPU/GPU cores with parallel distributed computation (either model parallelism or data parallelism), with shared large training data. For example, DistBelief [6] partitions and distributes large models to different machines for maximising large-scale parallel computation using all available cores, accelerating the training process. It does not consider constructing a generalisable model from distributed local learning on independent data. In contrast, FedReID considers the problem of optimising a generalisable model by asynchronous knowledge aggregation from multi-domain locally learned models without centrally sharing training data.

Private Deep Learning: Private deep learning [27, 28, 34] aims at constructing privacy preserving models and preventing the model from inverse attack [8, 27]. A popular solution [27, 28, 34] is to use knowledge distillation to transfer private knowledge from multiple teacher ensembles or a cumbersome teacher model to a public student model with restricted distillation on training data. In contrast, FedReID does not use any centralised training data (labelled or unlabelled) for model aggregation. Privacy is implemented intrinsically in FedReID by decentralised model training through iterative client-server collaborative learning by asynchronous (random) knowledge aggregation, without central (server) data sharing in model updates.

3. Methodology

Figure 6:
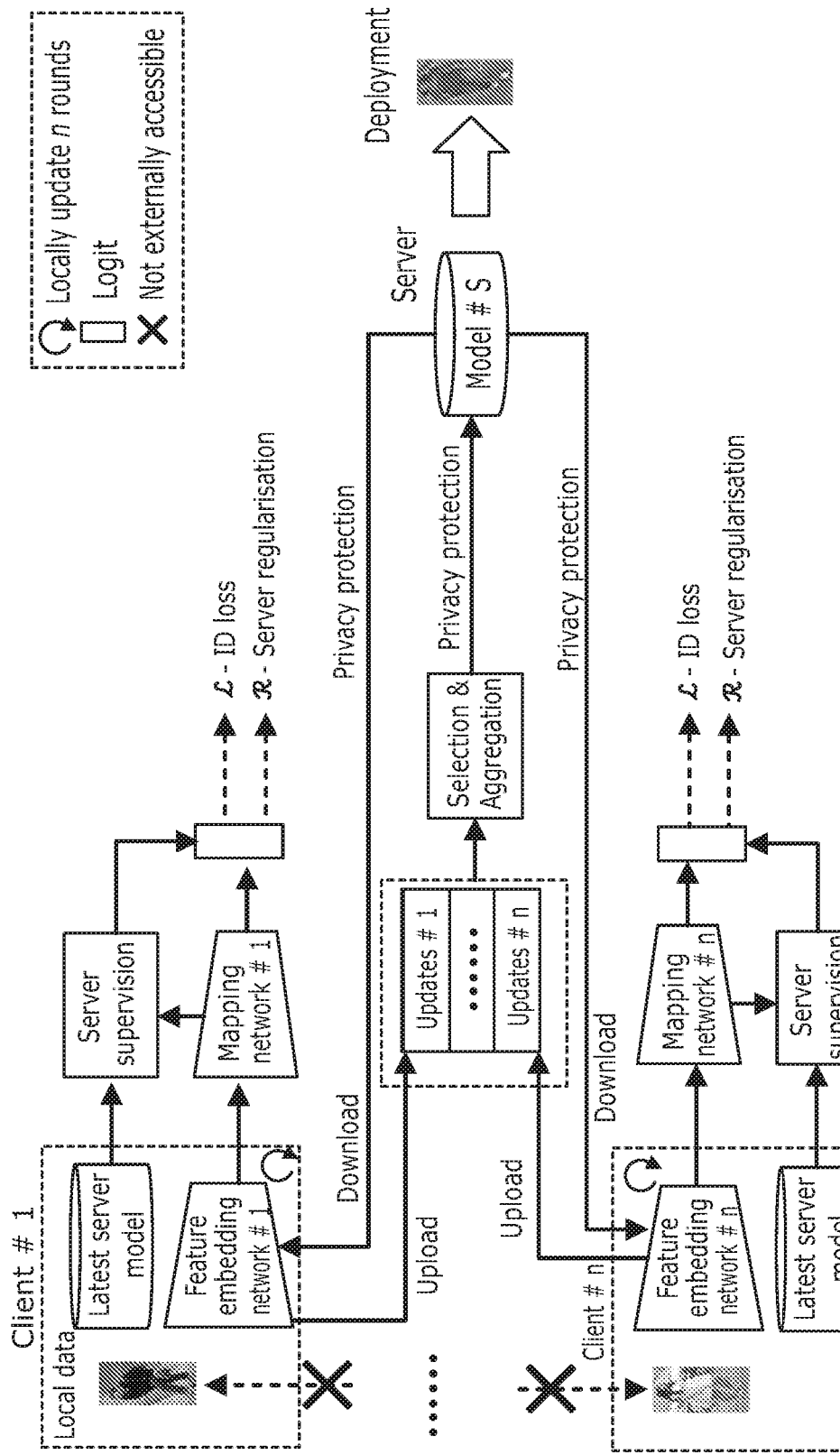
FIG. 6 is a schematic diagram showing an overview of the described FedReID.

Overview: An overview of the proposed FedReID method is depicted in FIG. 6. Suppose there are N sensitive (private) datasets captured from different locations/cities that cannot be shared for model training, N localised models (clients) are constructed for them. In the i-th client ($i \in N$), a feature embedding network $E_i(\cdot)$ is constructed to extract inherent features $V_i = \{v_{i,j}\}_{j=1}^{L}$ of each person (there are L person images and I identities) in each local dataset $X_i = \{x_{i,j}\}_{j=1}^{L}$, as:

$$v_{i,j} = E_i(x_{i,j}) \quad \text{[Equation 1]}$$

To learn domain-specific knowledge, a mapping network $M_i(\cdot)$ is constructed to map visual features to person label (identify) information $\mathcal{D}_i = \{d_{i,j}\}_{j=1}^{L}$:

$$d_{i,j} = M_i(v_{i,j}) \quad \text{[Equation 2]}$$

The optimisation objective of the i-th client is:

$$\mathcal{L}_i = \mathcal{L}_{i,ID} + \mathcal{R}_i \quad \text{[Equation 3]}$$

where $\mathcal{L}_{i,ID}$ is the identity classification loss and $\mathcal{R}_i$ is the server regularisation on the i-th client. All clients update their models locally with n rounds and then upload the updates (gradients g or weights ω of each neuron in the embedding networks) to a centralised server.

The centralised server model is a feature embedding network $E_s(\cdot)$ for extracting generic feature representations. It selects and aggregates iteratively the updates from the clients to construct the server model. Conversely, the aggregated updates are transmitted to the clients to update the local models so to facilitate bi-directional collaborations.

In deployment, the centralised model $E_s(\cdot)$ is directly used to extract features $V_s$ of each person and a generic distance metric (e.g. L2) is used for Re-ID matching.

Client-Server Iterative Updates: In FedReID, the local clients and the central server are iteratively updated by federated learning [25]. Suppose the i-th client is optimised using SGD with a fixed learning rate η, then the weights $\omega_i$ of the i-th client at t+1 local step can be updated by:

$$\omega_{i,t+1} \leftarrow \omega_{i,t} - \eta \nabla \mathcal{G}_i \quad \text{[Equation 4]}$$

where $\nabla \mathcal{G}_i$ is the set of average gradient of each neuron at the i-th client. After n rounds local updates in local clients, at the k-th global communication epoch, the server randomly selects C-fraction updates $N_C$ (here C [0,1]) for the server weights $\omega_{s,k}$ aggregation:

$$\omega_{s,k} \leftarrow \frac{1}{\lceil C \cdot N \rceil} \sum_{m \in N_C} \omega_{m,t=n,k} \quad \text{[Equation 5]}$$

where $1 \leq \lceil C.N \rceil \leq N$. Conversely, each client receives $\omega_{s,k}$ to update the local model:

$$\omega_{i,t=0,k+1} \leftarrow \omega_{s,k} \quad \text{[Equation 6]}$$

In this way, the local clients and the server are iteratively updated for $k_{max}$ global communication epochs.

FedReID Client-Server Collaboration: In person Re-ID, local datasets are usually captured in different locations (domains), where person populations (ID space) and background scenes (context) are different. In conventional federated learning, Eq. (6) is directly used by the centralised model to replace the localised model. For person Re-ID, this would lead to the loss of the domain-specific knowledge in each client model learning where the ID spaces are completely independent (no-overlap) among different clients. To optimise a centralised model across different domains, federated learning is reformulated to simultaneously consider the specific of each localised client and the generalisation of the centralised server. In FedReID, separate feature embedding networks for visual feature extraction and mapping networks for domain-specific knowledge optimisation are explored.

More specifically, ResNet-50 [12] is used as a feature embedding network (with parameters $\omega_{s,k}$) and Multi-Layer Perceptron (MLP) as a mapping network (with parameters $\omega^m_{s,k}$). The MLP in a mapping network consists of two fully connected layers. The first fully connected layer following by a batch normalization layer (BN(·)), a ReLU layer (ReLU(·)) and Dropout is used to map visual features to embedding features, while the second fully connected layer is used for person label (ID) classification:

$$d_{i,j} = W_2 \text{ReLU}(BN(W_1 v_{i,j} + b_1)) + b_2 \quad \text{[Equation 7]}$$

where $\{W_1, W_2, b_1, b_2\} \in \omega^m_{s,k}$ are to-be-learned parameters, designed to activate different domain-specific knowledge in each client (e.g. bags or luggage), therefore separating them from the bi-directional communications. To further facilitate the collaboration of the localised clients and the centralised server, moving average is used for local client updates (Eq. (8)) and server supervision as regularisation (see "Optimisation Objective" below) to provide additional domain-generalisable knowledge:

$$\omega_{i,t=0,k+1} \rightarrow (1-\alpha)\omega_{s,k} + \alpha\omega_{i,t=n,k} \quad \text{[Equation 8]}$$

where $\alpha$ is the update momentum. Note that domain-specific mapping network parameters $\omega^m_{s,k}$ are separated from the client-server bi-directional communications.

Optimisation Objective: In each local client, identity classification loss is used to learn domain-specific knowledge:

$$\mathcal{L}_{i,ID} = -\sum_{j=1}^{J} y_{i,j} \log \frac{\exp(d_{i,j})}{\sum_{b=1}^{J} \exp(d_{i,b})} \quad \text{[Equation 9]}$$

where $y_{i,j}$ is the ground-truth label. Moreover, as the over-all objective of FedReID is to construct a centralised server model capable of extracting generalisable feature representations from multiple local client models without sharing training data for out-of-the-box deployments, the localised clients are supervised by the server regularisation to facilitate optimal centralised feature aggregation. In k-th global communication epoch, the localised client stored a copy of the server model $\omega'_{s,k}$. Then, knowledge distillation [13] is used to transfer generalised knowledge from the centralised model to the localised models.

Specifically, soft probability distributions are computed for each client $\mathcal{P}^{cl}_{i,j}$ its server model copy $\mathcal{P}^{sv}_{i,j}$ as:

$$\mathcal{P}^{cl}_{i,j} = \frac{\exp(d_{i,j}/T)}{\sum_{b=1}^{J} \exp(d_{i,b}/T)} \quad \text{[Equation 10]}$$

$$\mathcal{P}^{sv}_{i,j} = \frac{\exp(d'_{i,j}/T)}{\sum_{b=1}^{J} \exp(d'_{i,b}/T)} \quad \text{[Equation 11]}$$

where T is a temperature to control the softness of probability distributions over classes [13], $d'_{i,j}$ is the logit computed by Eqs. (1) and (2) with $\omega'_{s,k}$. The server regularisation is defined as the Kullback-Leibler divergence $\mathcal{R}_i$ between $\mathcal{P}^{cl}_{i,j}$ and $\mathcal{P}^{sv}_{i,j}$:

$$\mathcal{R}_i = \gamma \sum_{j=1}^{J} \mathcal{P}^{sv}_{i,j} \cdot \log \frac{\mathcal{P}^{sv}_{i,j}}{\mathcal{P}^{cl}_{i,j}} \quad \text{[Equation 12]}$$

where $\gamma$ is a scale factor to compensate the soften probability distributions in Eqs. (10) and (11). This regularisation provides generic knowledge to facilitate the optimisation of the domain-specific user, especially in supervised deployment scenarios. Besides, as $\omega'_{s,k}$ is a copy of the up-to-date server model at the (k−1)-th global communication epoch, it should be updated on-the-fly as the advance of the training in local clients, so the server copy is optimised by $L_{i,sv}$, which is computed by Eq. (9) with $d'_{i,j}$.

Privacy Protection: In FedReID, local sensitive datasets are inherently protected by decentralised model training and the random aggregation in the centralised server. To further protect sensitive data from inverse attack [8], a white noise [9] is employed in the aggregation to hide the contributions of the randomly selected clients in Eq. (5):

$$\omega_{s,k} \leftarrow \frac{1}{\lceil CN \rceil} \sum_{m \in N_C} \omega_{m,t=n,k} + \beta \mathcal{N}(0,1) \quad \text{[Equation 13]}$$

where $\mathcal{N}(0,1)$ is the white noise matrices with mean 0 and variance 1, $\beta$ [0,1] is a scale factor to control the effect of the white noise on the centralised aggregation. When $\beta=0$, the white noise is removed from the aggregation, so Eq. (13) becomes Eq. (5). Moreover, in FedReID client-server collaboration, the collaboration information in Eq. (8) can be further hidden as:

$$\omega_{i,t=0,k+1} \rightarrow (1-\alpha)\omega_{s,k} + \alpha\omega_{i,t=n,k} + \beta \mathcal{N}(0,1) \quad \text{[Equation 14]}$$

Summary: In FedReID, the localised clients and the centralised server are iteratively updated to optimise a generalised Re-ID model with privacy protection. At test time, the centralised model is used to extract generic features for Re-ID matching using a generic distance metric (L2). The training process of FedReID is summarised in Algorithm 1.

```
Algorithm 1 Federated Person Re-Identification.

Intialise: Client number N ,
   local datasets X_i (i = 1, ...N),
   selected client fraction C,
   model parameters ω_{i,t=0,k}, ω_{s,k}
1: for k = 1 → k_max do /*
   Global communications */
2:   N_C ← Randomly select
   C-fraction clients from N
3:   for i = 1 → [CN] do /*
   i-th client */
4:     for t = 1 → t_max do /*
   Local steps */
```

```
Algorithm 1 Federated Person Re-Identification.

5: Update client parameters
    (Eq. (14))
 6: Forward to get features
    V_i (Eq. (1))
 7: Forward to get logits d_{i,j},
    d'_{i,j} (Eq. (7))
 8: Compute identity loss 𝓛_{i,ID},
    𝓛_{i,sv} (Eq. (9))
 9: Compute server regularisation
    R_i (Eq. (12))
10: Backward to update
    ω_{i,t,k} Eq. (3)
11: end for
12: end for
13: Update the centralised
    server model with Eq. (13)
14: end for
15: Output: A generalised
    embedding feature model E_{sv}
```

4. Experiments

4.1. Datasets and Settings

Datasets: Ten Re-ID datasets and one person search dataset are used for evaluating FedReID. Specifically, four larger Re-ID datasets (Market-1501 [47], DukeMTMC-ReID [49], CUHK03 detected mode [20] and MSMT17 [36]) are used as non-shared local data for training four different local clients and to construct a central FedReID model. The FedReID model is then tested on separate six smaller Re-ID datasets (VIPeR [11], iLIDS [48],3DPeS [3], CAVIAR [5], PRID [14] and GRID [23]), plus a large-scale person search dataset (CUHK-SYSU [40]) as new target domains for out-of-the-box deployment tests without training data. Commonly these smaller data sets are inadequate for training deep models due to their small data sizes and poorer data qualities compared to more recent larger Re-ID datasets designed to accommodate deep learning. Not surprisingly the benchmark performances of existing models on these small Re-ID datasets have not been improved over the years despite the advances of deep learning. So they are good tests for the FedReID model. For the CUHK-SYSU test, the ground-truth person bounding box annotation from the dataset for Re-ID test was used, of which there are 2900 query persons and each person contains at least one image in the gallery (both query and gallery sets are fixed). The FedReID person Re-ID evaluation setting is summarised in Table 1. Common training/testing splits for model training and evaluation (10 trials for small Re-ID datasets) were employed. Note, each of the four local clients didn't share its training dataset with other clients nor the server. This is different from other generalised Re-ID methods [39, 29, 31]. FedReID trains on decentralised data, while existing methods train on centralised data.

TABLE 1

The FedReID person Re-ID evaluation setting (train on independent local clients, tested on new domains) "ID": number of identities; "Img" Number of images.

| Types | Benchmarks | Train ID | Train Img | Test ID | Test Img |
|---|---|---|---|---|---|
| Local | Market | 751 | 12937 | — | — |
| Clients Training | Duke | 702 | 16522 | — | — |
| | CUHK03 | 767 | 7365 | — | — |
| | MSMT17 | 1041 | 30248 | — | — |
| New-Domain Testing | VIPeR | — | — | 316 | 632 |
| | iLIDS | — | — | 60 | 120 |
| | 3DPeS | — | — | 96 | 192 |
| | CAVIAR | — | — | 36 | 72 |
| | PRID | — | — | 100 | 749 |
| | GRID | — | — | 125 | 1025 |
| | CUHK-SYSU | — | — | 2900 | 8347 |

Evaluation Metrics: The Cumulative Matching Characteristic (CMC) and mean Average Precision (mAP) for person Re-ID performance evaluation were used.

Implementation Details: ResNet-50 [12] (pre-trained on ImageNet) was used as the embedding networks and MLP with two fully connected layers was used as the mapping networks. N=4 local clients were used (each client trains on a private data set) and C=0.5 in Eqs. (13) and (5). Experiments on evaluating the effects of different local clients are further provided. In Eq. (13) and (14), $\beta \in [0,1]$ is determined by different privacy protection requirements. For fair comparison with existing Re-ID methods, $\beta=0$ in the experiments. Ablation studies are further provided on privacy protection control parameter $\beta$. Following [13], T is set as T=3 in Eqs. (10) and (11), and used $\gamma=T^2$ in Eq. (12). $\alpha$ is empirically set $\alpha=0.5$ in Eqs. (8) and (14), batch size to 32, maximum global communication epochs $k_{max}=100$, and maximum local steps $t_{max}=1$. SGD was used as the optimiser with Nesterov momentum 0.9 and weight decay $5e^{-4}$. The learning rates were set to 0.01 for embedding networks and 0.1 for mapping networks, which decay by a factor 0.1 after 20 global epochs. The output feature dimension is 2048-D.

4.2. Comparisons with the State-of-the-Art

4.2.1 Evaluations on Re-ID Benchmarks

Competitors: FedReID is compared with 14 state-of-the-art Re-ID methods in three groups: (1) five supervised methods (kLFDA [41], LOMO+XQDA [22], L2R [26], DGD [39], P2S [50]), (2) four cross-domain fine-tuning unsupervised methods (DSTML [15], UMDL [29], TJAIDL [35], PAUL [43]), and (3) five generalised unsupervised methods (SSDAL [32], JSTL [39], OSML [1], SyRI [2], DIMN [31]).

Results: As shown in Table 2, FedReID performs competitively against the state-of-the-art competitors. Specifically, FedReID achieves the best rank-1 accuracies on iLIDS (70.3%), 3DPeS (73.2%) and CAVIAR (48.1%). On VIPeR, DIMN [31] ranks the first with 51.2% rank-1 accuracy while FedReID is the second-best on rank-1 accuracy (46.7%). On PRID, where illumination and pose variations between two camera views are drastic, supervised methods (e.g. DGD [39] and P2S [50]) perform significantly better than other unsupervised methods. On GRID, where image quality is poor, FedReID achieves 23.8% rank-1 accuracy, which is the second-best.

TABLE 2

Comparisons with the state-of-the-art person Re-ID methods on VIPeR, iLIDS 3DPeS, CAVIAR, PRID and GRID. Rank-1 accuracies are reported. The best results are shown surrounded by a box, and the second-best are underlined.

| Methods | Ref. | Settings | Privacy? | VIPeR | iLIDS | 3DPeS | CAVIAR | PRID | GRID |
|---|---|---|---|---|---|---|---|---|---|
| kLFDA [41] | ECCV14 | Supervised | x | 32.3 | 38.0 | 54.0 | 39.1 | — | — |
| LOMO + XQDA [22] | CVPR15 | | x | 40.0 | — | — | — | — | 19.0 |
| L2R [26] | CVPR15 | | x | 45.9 | 50.3 | 53.3 | — | 17.9 | — |
| DGD [39] | CVPR16 | | x | 38.6 | 64.6 | 56.0 | — | 64.0 | — |
| P2S [50] | CVPR17 | | x | — | — | 71.2 | — | 70.7 | — |
| DSTML [15] | CVPR15 | Fine-tune* | x | 8.6 | 33.4 | 32.5 | 28.2 | — | — |
| UMDL [29] | CVPR16 | | x | 31.5 | 49.3 | — | 41.6 | 24.2 | — |
| TJAIDL [35] | CVPR18 | | x | 38.5 | — | — | — | 26.8 | — |
| PAUL [43] | CVPR19 | | x | 45.2 | — | — | — | — | — |
| SSDAL [32] | ECCV16 | Generalised | x | 43.5 | — | — | — | 22.6 | 22.4 |
| JSTL$_{LOO}$† [39] | CVPR16 | | x | 20.9 | 43.5 | — | — | 2.0 | — |
| OSML [1] | CVPR17 | | x | 34.3 | 51.2 | — | — | 41.4 | — |
| SyRI [2] | ECCV18 | | x | 43.0 | 56.5 | — | — | 43.0 | — |
| DIMN [31] | CVPR19 | | x | 51.2 | 70.2 | — | — | 39.2 | 29.3 |
| FedReID | Ours | Federated | ✓ | 46.7 | 70.3 | 73.2 | 48.1 | 32.3 | 23.8 |

*: Fine-tuning with unlabelled target domains;
†: leave-one-out unsupervised result reported in [1].

Discussions: Given that FedReID does not employ centralised training data nor fine-tuning using target domain data, it performs remarkably well against the state-of-the-art methods using either or both above, even when compared with supervised methods using target domain data. More importantly, FedReID is designed uniquely for protecting local client privacy by learning a generalisable model without centralised sharing of training data. No existing methods considers privacy protection requirements.

4.2.2 Evaluations on Person Search Benchmark

To further evaluate FedReID on a larger target domain test, the Re-ID subset of CUHK-SYSU person search benchmark is used, which has distinctively different scene context to most other re-id benchmarks above, e.g. street snaps captured by hand-held cameras and movie snapshots contained pedestrians with rich pose/background variations.

As shown in Table 3, in unsupervised setting, FedReID achieves the best performance compared with other methods. However, the state-of-the-art supervised methods perform better than FedReID. For scalability on the other hand they are limited by the availability of labelled training data in every target domain, plus the additional constraint from increasing privacy concerns. In contrast, FedReID can be deployed out-of-the-box with privacy protection. FedReID achieves 76.6% in mAP and 78.1% in rank-1 accuracy, as compared to the supervised backbone model (ResNet-50) with 82.2%/84.5% in mAP/R1.

TABLE 3

Comparisons with the state-of-the-art on CUHK-SYSU. *: Experiments using ground-truth person images and a gallery size of 100 images per query; †: Additional image-language descriptions are used. Best results of supervised and unsupervised methods are in bold, respectively.

| Methods | Settings | mAP | R1 | R5 | R10 |
|---|---|---|---|---|---|
| DSIFT* [46] + KISSME [17] | Supervised | 56.2 | 61.9 | — | — |
| LOMO + XQDA* [22] | | 72.4 | 76.7 | — | — |
| OIM* [40] | | 77.9 | 80.5 | — | — |
| GLIA† [4] | | 91.4 | 92.0 | 96.7 | 97.9 |
| Backbone (Centralised) | | 82.2 | 84.5 | 91.8 | 93.8 |
| DSIFT* [46] + Euclidean | Unsupervised | 41.1 | 45.9 | — | — |
| BoW* [47] + Cosine | | 62.5 | 67.2 | — | — |
| DLDP* [30] | | 74.0 | 76.7 | — | — |
| FedReID | | 76.6 | 78.1 | 88.5 | 91.3 |

4.3. Ablation Studies

Compare with Individuals and Ensembles: To compare FedReID with individual clients and their ensembles, the backbone models are separately trained on four localised data sets as individuals and the concatenation of corresponding features are used as the ensembles. As shown in Table 4, FedReID significantly outperforms the other methods. These results indicate that the collaboration between the localised clients and the centralised server facilitates holistic optimisation, enabling FedReID to construct a better generalisable model.

TABLE 4

Comparisons with individual client models and ensembles on VIPeR and CUHK-SYSU. Base: The backbone model.

| | | VIPeR | | CUHK-SYSU | |
|---|---|---|---|---|---|
| Settings | Methods | mAP | R1 | mAP | R1 |
| Individuals | Base$_{Market}$ | 26.6 | 18.6 | 61.2 | 64.9 |
| | Base$_{Duke}$ | 27.9 | 19.8 | 55.9 | 60.2 |
| | Base$_{CUHK03}$ | 24.4 | 16.2 | 51.8 | 56.0 |
| | Base$_{MSMT}$ | 34.1 | 24.4 | 64.3 | 68.2 |
| Ensembles | Feat-Concatenation | 31.9 | 22.7 | 67.5 | 71.3 |

TABLE 4-continued

Comparisons with individual client models
and ensembles on VIPeR and CUHK-
SYSU. Base: The backbone model.

| Settings | Methods | VIPeR | | CUHK-SYSU | |
| --- | --- | --- | --- | --- | --- |
| | | mAP | R1 | mAP | R1 |
| Federated | FedReID | 56.6 | 46.7 | 76.6 | 78.1 |

Federated Learning Formulation Variants: To evaluate the paradigm in FedReID, FedReID is compared with two conventional federated formulation variants (FedSGD [25] and FedAVG [25]). The class number is set as maximum identity number among local clients, so the whole network can be optimised using FedSGD and FedAVG. As shown in Table 5, FedReID performs better than FedSGD and FedAVG on VIPeR. Besides, on the small-scale dataset, it can be seen that centralised supervised methods are prone to overfitting and inferior to federated methods. Note, conventional federated methods are designed for learning a shared model with decentralised data from the same domain, rather than for learning from multiple non-overlapping domains (ID spaces). To further verify the effectiveness of FedReID approach for the same-domain decentralised training problem, a ResNet-32 is employed as the model and the results are reported on CIFAR-10 [19] (reduce as the server and the clients share the same knowledge). As shown in Table 5, FedReID remains competitive for same-domain decentralised learning (slightly inferior to FedAVG on CIFAR-10).

TABLE 5

Comparisons with federated formulation
variants on VIPeR and CIFAR-10

| Methods | VIPeR | | CIFAR-10 |
| --- | --- | --- | --- |
| | mAP | R1 | Top-1 |
| FedSGD [25] | 45.5 | 36.4 | 90.4 |
| FedAVG [25] | 45.0 | 35.4 | 93.1 |
| FedReID | 56.6 | 46.7 | 92.7 |
| Centralised (Supervised) | 31.9 | 19.9 | 93.4 |

Figure 7:
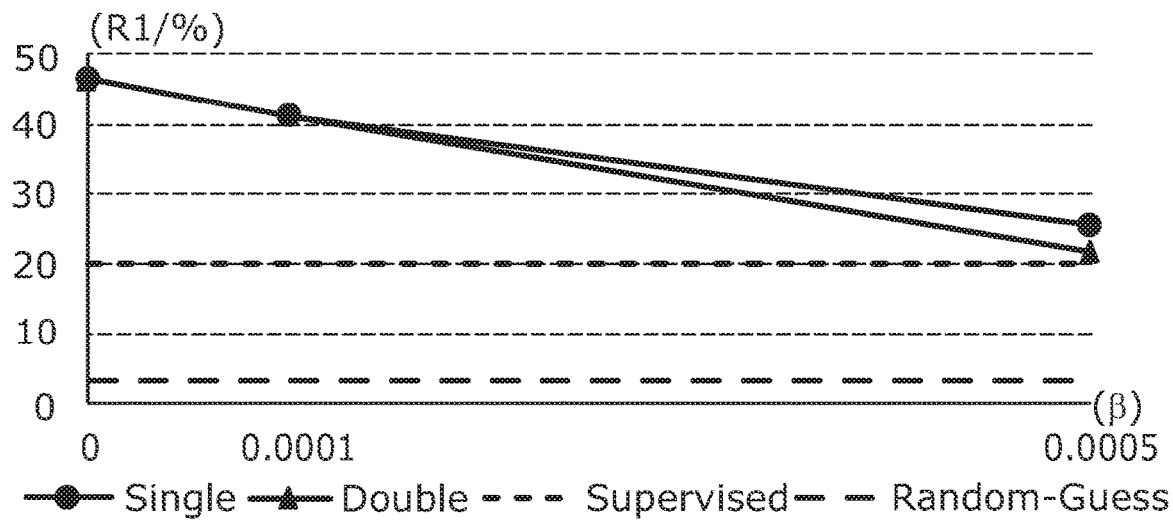
FIG. 7 is a plot evaluating the privacy protection control parameter.

Effects from Privacy Protection Control: To verify the impact of privacy protection control parameter $\beta$ on model aggregation, the effect from changing the values of $\beta$ on FedReID performance is evaluated in both single and double protection modes. FIG. 7 shows evaluations on the privacy protection control parameter $\beta$ on VIPeR. The line marked 'Random Guess' in FIG. 7 is a result of initialisation with ImageNet pre-trained weights without training. No $\beta$ was applied in the supervised and random guess methods.

FIG. 7 shows that (1) The rank-1 accuracy gradually decreases when $\beta$ value increases, but the FedReID performance is significantly better than random guess; (2) Single $\beta$ protection (Eq. (13) only) performs slightly better than double protection (both Eq. (13) and Eq. (14)), consistent with intuition; (3) From $\beta=0$ to $\beta=0.0005$, FedReID performance remains better than the supervised method which is overfitting.

Figure 8:
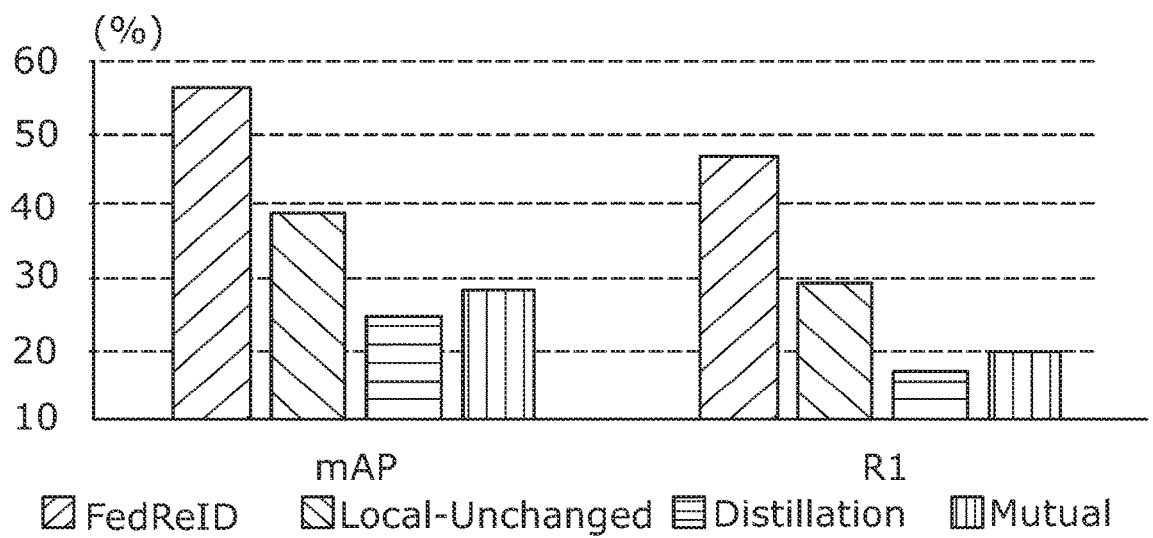
FIG. 8 is a plot evaluating the server knowledge.

Server Knowledge: To evaluate the benefit of propagating central server knowledge to local clients in model updates, FedReID is compared with FedReID+local clients unchanged (i.e. no server knowledge for updates in Eq. (14)), knowledge distillation [13] and mutual learning [45]. Whilst knowledge distillation uses a model trained on one data set to transfer knowledge from clients (three datasets) to the server, mutual learning uses the aggregated model of three clients to reinforce a server model trained on one data set. FIG. 8 shows evaluations on the server knowledge on VIPeR. As shown in FIG. 8, FedReID outperforms distillation and mutual learning in the generalised Re-ID experiments. FedReID performance degrades when no server knowledge is used for client updates.

Figure 9:
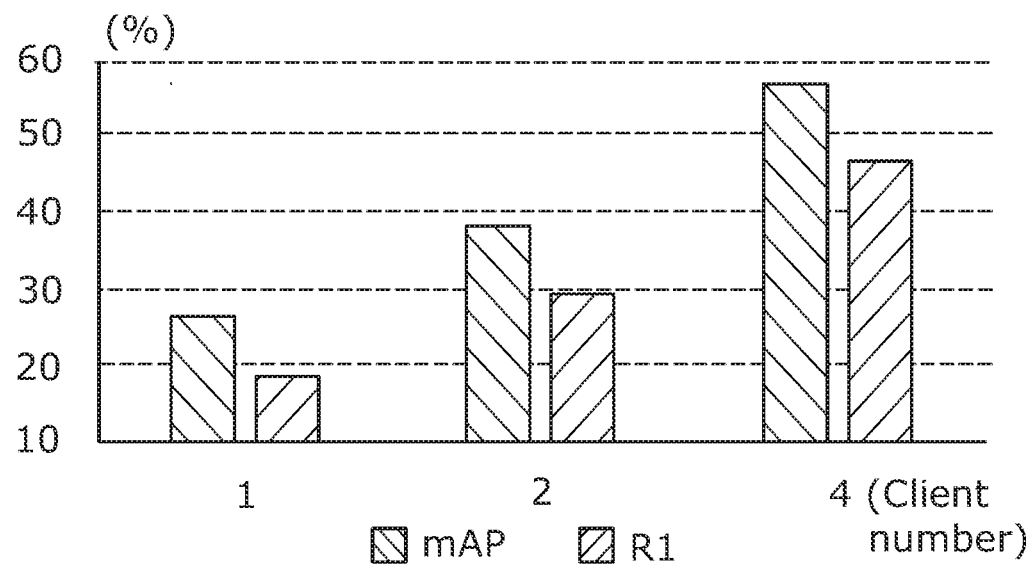
FIG. 9 is a plot evaluating the client number parameter.

Client Number N: FIG. 9 shows evaluations on the client numbers on VIPeR. FIG. 9 compares central server aggregations from different numbers of local clients (N=1,2,4), where N=1, N=2 and N=4 denote Market, Market+Duke and Market+Duke+CUHK+MSMT as clients. These experiments show that collaboration of multi-clients is good for learning generalisable knowledge, and the central server benefits from multiple independent clients learning from different domains.

Figure 10:
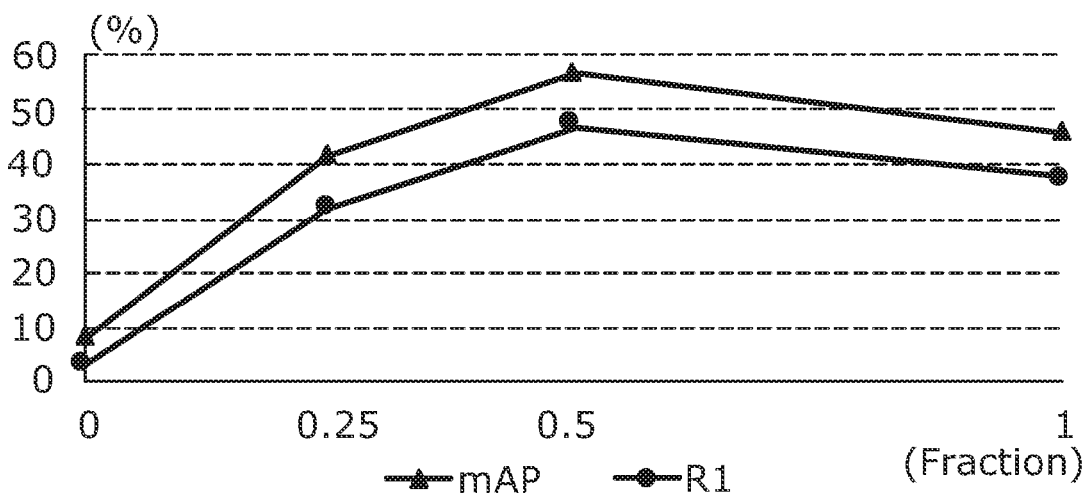
FIG. 10 is a plot evaluating the client fraction parameter.

Client Fraction C: To further investigate the selection and aggregation in FedReID, FedReID is evaluated with different client fraction (Eq. (13) whilst the total client number is 4). FIG. 10 shows evaluations on the client fraction on VIPeR. From FIG. 10, it can be observed that: (1) Updating with an arbitrary client (C=0.25) is inferior to aggregating multiple clients; (2) Aggregating randomly selected clients (C=0.5) achieves better performance than aggregating all the clients (C=1.0) because the latter accumulates more model biases.

Figure 11:
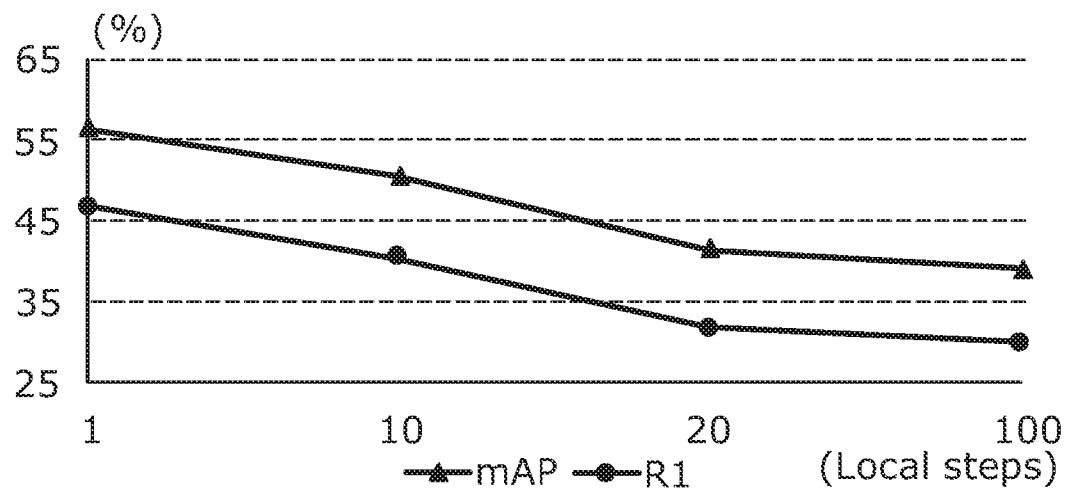
FIG. 11 is a plot evaluating the client local step parameter.

Client Local Step $t_{max}$: Client local optimisation steps can control local client domain-specific optimisation and potentially promote communication efficiency [25]. The performance of FedReID is reported with different client local steps in FIG. 11. Overall, when $t_{max}<10$, FedReID achieves the state-of-the-art performance. The performance of FedReID gradually decreases due to the accumulation of biases in each local client. Therefore, in FedReID, small local update steps in the collaboration are set.

Figure 12:
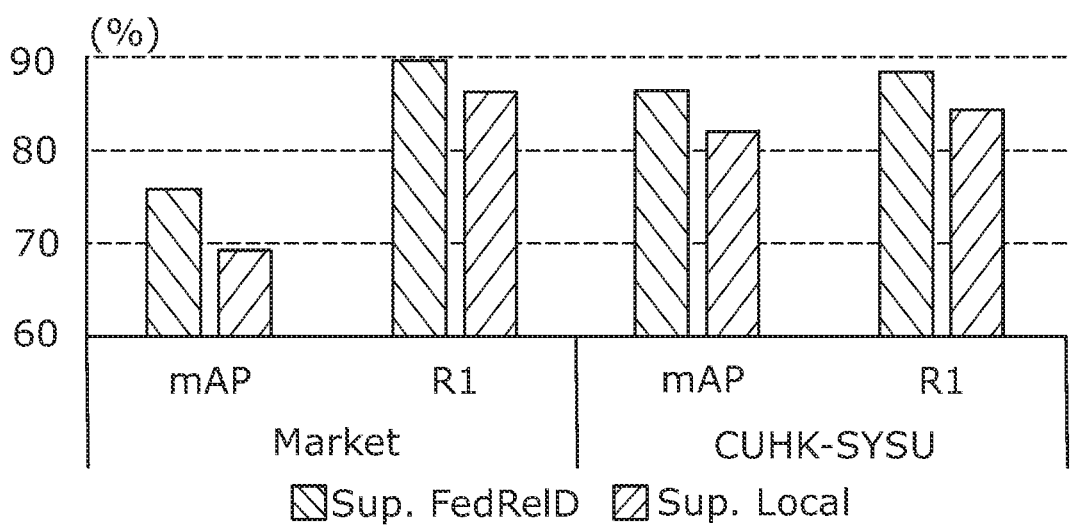
FIG. 12 is a plot evaluating the various supervised deployment scenarios.

Supervised Deployment: In addition to the out-of-the-box deployment tests, FedReID has been verified on two supervised Re-ID scenarios: (1) A client which contains labelled training data for collaboration (e.g. Market-1501) and (2) a new user which contains training data but is not optimised in the collaboration (e.g. CUHK-SYSU). Supervised FedReID (i.e. Eq. (12) as additional supervision for supervised Re-ID) is compared with local supervised Re-ID (no additional supervision). FIG. 12 shows evaluations in the supervised deployment scenarios. As shown in FIG. 12, supervised FedReID outperforms local supervised learning, which shows that FedReID can facilitate supervised Re-ID deployments.

5. Conclusion

There is here proposed and formulated Federated Person Re-Identification (FedReID), a fundamentally new Re-ID paradigm for decentralised model training on distributed non-sharing local data with privacy protection control. For each local client, a feature embedding network and a mapping network is used to learn domain-specific knowledge, while in a centralised server, a generalisable feature embedding model is constructed by both aggregating local updates and propagating central knowledge without sharing local data. By iterative collaborative learning between local clients and the central server, FedReID optimises a generalisable model for out-of-the-box Re-ID deployment in new target domains without any training data (labelled or unlabelled). Extensive experiments show the effectiveness of FedReID against the state-of-the-art Re-ID methods from using 11 Re-ID and person search evaluation datasets.

6. References

[1] Slawomir Bak and Peter Carr. One-shot metric learning for person re-identification. In CVPR, 2017. 6
[2] Slawomir Bak, Peter Carr, and Jean-Francois Lalonde. Domain adaptation through synthesis for unsupervised person re-identification. In ECCV, 2018. 6
[3] Davide Baltieri, Roberto Vezzani, and Rita Cucchiara. 3DPeS: 3D people dataset for surveillance and forensics. In ACM J-HGBU, 2011. 2, 5
[4] Dapeng Chen, Hongsheng Li, Xihui Liu, Yantao Shen, Jing Shao, Zejian Yuan, and Xiaogang Wang. Improving deep visual representation for person re-identification by global and local image-language association. In ECCV, 2018. 7
[5] Dong Seon Cheng, Marco Cristani, Michele Stoppa, Loris Bazzani, and Vittorio Murino. Custom pictorial structures for re-identification. In BMVC, 2011. 2, 5
[6] Jeffrey Dean, Greg Corrado, Rajat Monga, Kai Chen, Matthieu Devin, Mark Mao, Marc'aurelio Ranzato, Andrew Senior, Paul Tucker, Ke Yang, et al. Large scale distributed deep networks. In NeurIPS, 2012. 3
[7] Qi Dong, Shaogang Gong, and Xiatian Zhu. Person search by text attribute query as zero-shot learning. In ICCV, 2019. 1
[8] Matt Fredrikson, Somesh Jha, and Thomas Ristenpart. Model inversion attacks that exploit confidence information and basic countermeasures. In ACM CCS, 2015. 3, 5
[9] Robin C Geyer, Tassilo Klein, and Moin Nabi. Differentially private federated learning: A client level perspective. In NeurIPS, 2017. 2, 5
[10] Shaogang Gong, Marco Cristani, Shuicheng Yan, and Chen Change Loy. Person Re-Identification. Springer, 2014. 1
[11] Douglas Gray and Hai Tao. Viewpoint invariant pedestrian recognition with an ensemble of localized features. In ECCV, 2008. 2, 5
[12] Kaiming He, Xiangyu Zhang, Shaoqing Ren, and Jian Sun. Deep residual learning for image recognition. In CVPR, 2016. 4, 6
[13] Geoffrey Hinton, Oriol Vinyals, and Jeff Dean. Distilling the knowledge in a neural network. arXiv preprint arXiv:1503.02531, 2015. 4, 6, 7
[14] Martin Hirzer, Csaba Beleznai, Peter M Roth, and Horst Bischof. Person re-identification by descriptive and discriminative classification. In SCIA, 2011. 2, 5
[15] Junlin Hu, Jiwen Lu, and Yap-Peng Tan. Deep transfer metric learning. In CVPR, 2015. 6
[16] Forrest N landola, Matthew W Moskewicz, Khalid Ashraf, and Kurt Keutzer. Firecaffe: near-linear acceleration of deep neural network training on compute clusters. In CVPR, 2016. 3
[17] Martin Koestinger, Martin Hirzer, Paul Wohlhart, Peter M Roth, and Horst Bischof. Large scale metric learning from equivalence constraints. In CVPR, 2012. 7
[18] Jakub Konečný, H Brendan McMahan, Felix X Yu, Peter Richtárik, Ananda Theertha Suresh, and Dave Bacon. Federated learning: Strategies for improving communication efficiency. arXiv preprint arXiv:1610.05492, 2016. 2
[19] Alex Krizhevsky and Geoffrey Hinton. Learning multiple layers of features from tiny images. Technical report, 2009. 7
[20] Wei Li, Rui Zhao, Tong Xiao, and Xiaogang Wang. Deep-reid: Deep filter pairing neural network for person re-identification. In CVPR, 2014. 2, 5
[21] Wei Li, Xiatian Zhu, and Shaogang Gong. Harmonious attention network for person re-identification. In CVPR, 2018.1, 2
[22] Shengcai Liao, Yang Hu, Xiangyu Zhu, and Stan Z Li. Person re-identification by local maximal occurrence representation and metric learning. In CVPR, 2015. 6, 7
[23] Chen Change Loy, Chunxiao Liu, and Shaogang Gong. Person re-identification by manifold ranking. In ICIP, 2013. 2,5
[24] James L McClelland and David E Rumelhart. Explorations in parallel distributed processing: A handbook of models, programs, and exercises. MIT press, 1989. 3
[25] H Brendan McMahan, Eider Moore, Daniel Ramage, Seth Hampson, et al. Communication-efficient learning of deep networks from decentralized data. In AISTATS, 2017. 2, 4, 7, 8.
[26] Sakrapee Paisitkriangkrai, Chunhua Shen, and Anton Van Den Hengel. Learning to rank in person re-identification with metric ensembles. In CVPR, 2015. 6
[27] Nicolas Papernot, Marti'n Abadi, Ulfar Erlingsson, Ian Goodfellow, and Kunal Talwar. Semi-supervised knowledge transfer for deep learning from private training data. In ICLR,2017. 3
[28] Nicolas Papernot, Shuang Song, Ilya Mironov, Ananth Raghunathan, Kunal Talwar, and Ulfar Erlingsson. Scalable private learning with pate. In ICLR, 2018. 3
[29] Peixi Peng, Tao Xiang, Yaowei Wang, Massimiliano Pontil, Shaogang Gong, Tiejun Huang, and Yonghong Tian. Unsupervised cross-dataset transfer learning for person re-identification. In CVPR, 2016. 5, 6
[30] Arne Schumann, Shaogang Gong, and Tobias Schuchert. Deep learning prototype domains for person re-identification. In ICIP, 2017. 7
[31] Jifei Song, Yongxin Yang, Yi-Zhe Song, Tao Xiang, and Timothy M Hospedales. Generalizable person re-identification by domain-invariant mapping network. In CVPR, 2019. 1, 2, 5, 6
[32] Chi Su, Shiliang Zhang, Junliang Xing, Wen Gao, and Qi Tian. Deep attributes driven multi-camera person re-identification. In ECCV, 2016. 6
[33] Yifan Sun, Liang Zheng, Yi Yang, Qi Tian, and Shengjin Wang. Beyond part models: Person retrieval with refined part pooling (and a strong convolutional baseline). In ECCV, 2018. 1, 2
[34] Ji Wang, Weidong Bao, Lichao Sun, Xiaomin Zhu, Bokai Cao, and S Yu Philip. Private model compression via knowledge distillation. In AAAI, 2019. 3
[35] Jingya Wang, Xiatian Zhu, Shaogang Gong, and Wei Li. Transferable joint attribute-identity deep learning for unsupervised person re-identification. In CVPR, 2018. 1, 2, 6
[36] Longhui Wei, Shiliang Zhang, Wen Gao, and Qi Tian. Person transfer gan to bridge domain gap for person re-identification. In CVPR, 2018. 2, 5
[37] Guile Wu, Xiatian Zhu, and Shaogang Gong. Person re-identification by ranking ensemble representations. In ICIP, 2019. 1, 2
[38] Guile Wu, Xiatian Zhu, and Shaogang Gong. Spatio-temporal associative representation for video person re-identification. In BMVC, 2019. 1
[39] Tong Xiao, Hongsheng Li, Wanli Ouyang, and Xiaogang Wang. Learning deep feature representations with domain guided dropout for person re-identification. In CVPR, 2016. 2, 5, 6

[40] Tong Xiao, Shuang Li, Bochao Wang, Liang Lin, and Xiao-gang Wang. Joint detection and identification feature learning for person search. In CVPR, 2017. 2, 5, 7

[41] Fei Xiong, Mengran Gou, Octavia Camps, and Mario Sznaier. Person re-identification using kernel-based metric learning methods. In ECCV, 2014. 6

[42] Qiang Yang, Yang Liu, Tianjian Chen, and Yongxin Tong. Federated machine learning: Concept and applications. ACM TIST, 2019. 2

[43] Qize Yang, Hong-Xing Yu, Ancong Wu, and Wei-Shi Zheng. Patch-based discriminative feature learning for unsupervised person re-identification. In CVPR, 2019. 1, 2, 6

[44] Xinyu Zhang, Jiewei Cao, Chunhua Shen, and Mingyu You. Self-training with progressive augmentation for unsupervised cross-domain person re-identification. In ICCV, 2019. 1, 2

[45] Ying Zhang, Tao Xiang, Timothy M Hospedales, and Huchuan Lu. Deep mutual learning. In CVPR, 2018. 7

[46] Rui Zhao, Wanli Ouyang, and Xiaogang Wang. Unsupervised salience learning for person re-identification. In CVPR, 2013. 7

[47] Liang Zheng, Liyue Shen, Lu Tian, Shengjin Wang, Jingdong Wang, and Qi Tian. Scalable person re-identification: A benchmark. In ICCV, 2015. 2, 5, 7

[48] Wei-Shi Zheng, Shaogang Gong, and Tao Xiang. Associating groups of people. In BMVC, 2009. 2, 5

[49] Zhedong Zheng, Liang Zheng, and Yi Yang. Unlabeled samples generated by gan improve the person re-identification baseline in vitro. In ICCV, 2017. 2, 5

[50] Sanping Zhou, Jinjun Wang, Jiayun Wang, Yihong Gong, and Nanning Zheng. Point to set similarity based deep feature learning for person re-identification. In CVPR, 2017. 6

The invention claimed is:

1. A method for generating an optimised domain-generalizable model for re-identification of a target in a set of candidate images, comprising:
   optimising a local feature embedding model for domain-specific feature representation at each client of a plurality of clients, the local feature embedding model at each client of a plurality of clients optimised for a respective data set associated with a domain of each client of the plurality of clients;
   receiving, at a central server from each client of the plurality of clients, information on changes to the local feature embedding model at each respective client resulting from the optimising step;
   updating, at the central server, a global feature embedding model for domain-generalizable feature representation based on the changes to the local feature embedding model at each respective client of at least a subset of the plurality of clients;
   receiving, at each client of the plurality of clients from the central server, information representative of the updates to the global feature embedding model;
   mapping, at each client of the plurality of clients, on to the respective local feature embedding model, at least a portion of the received updates to the global feature embedding model;
   updating, at each client of the plurality of clients, the respective local feature embedding model based on the mapped updates; and
   repeating each of the previous steps until convergence criteria are met for the optimisation of the local feature embedding model at each of the plurality of local clients, wherein the global feature embedding model is the optimised domain-generalizable model for re-identification of a target image in a set of candidate images.

2. The method of claim 1, wherein the respective data set associated with a domain of each client of the plurality of clients is an independent data set.

3. The method of claim 2, wherein each independent data set is non-overlapping.

4. The method of claim 1, wherein updating the global feature embedding model based on the changes to at least a subset of the local feature embedding model at each respective client, comprises:
   selecting a subset of the plurality of clients;
   aggregating, at the central server, the information on changes to the local feature embedding model received from each client of the selected subset of the plurality of client to determine the aggregate changes; and
   updating the global feature embedding model based on the aggregate changes.

5. The method of claim 4, wherein aggregating the information on changes to the local feature embedding model received from each client of the selected subset of the plurality of client, comprises:
   averaging the information on changes to the local feature embedding model received from each client of the selected subset of the plurality of clients.

6. The method of claim 4, wherein, prior to aggregating the information, the further comprises:
   applying white noise to the information on changes to the local feature embedding model at each respective client of the selected subset of the plurality of clients.

7. The method of claim 1, wherein receiving, at each client of the plurality of clients from the central server, information representative of the updates to the global feature embedding model comprises receiving, at each client of the plurality of clients from the central server, the global feature embedding model.

8. The method of claim 7, wherein mapping, at each client of the plurality of clients, on to the respective local feature embedding model, at least a portion of the received updates to the global feature embedding model, further comprises:
   determining, at each local client of the plurality of clients, a probability distribution for the respective local feature embedding model applied to the data set associated with a domain of the respective client;
   determining, at each local client of the plurality of clients, a probability distribution for the global feature embedding model applied to the data set associated with a domain of the respective client;
   determining, at each local client of the plurality of clients, a divergence between the probability distribution for the respective local feature embedding model and the probability distribution for the global feature embedding model;
   based on the determined divergence, identifying, at each local client of the plurality of clients, the updates to the global feature embedding model that are relevant to the respective local feature embedding model; and
   updating, at each local client of the plurality of clients, the respective local feature embedding model based on the identified relevant updates to the global feature embedding model.

9. The method of claim 1, wherein after convergence criteria are met for the optimisation of the local feature embedding model at each of the plurality of local clients, the method further comprises:
   applying the global feature embedding model to characterize a target;

applying the global feature embedding model to characterize each image of a set of candidate images; and
using a distance metric to identify the candidate images having sufficient similarity to the target image.

10. The method of claim 1, further comprising:
introducing a further client to the plurality of clients;
setting the local feature embedding model at the further client as the global feature embedding model; and
repeating each of the steps of the method until the convergence criteria are met for the optimisation of the local feature embedding model at each of the plurality of local clients, including the further client.

11. A system for generating an optimised domain-generalizable model for re-identification of a target image in a set of candidate images, comprising:
a central server, hosting a global feature embedding model for domain-generalizable feature representation; and
a plurality of clients, each client hosting a local feature embedding model for domain-specific feature representation, each client of the plurality of clients having access to a respective data set associated with a domain of each client of the plurality of clients;
the central server being configured to:
receive, from each client of the plurality of clients, information on changes to the local feature embedding model at each respective client;
update the global feature embedding model for feature representation, based on the changes to the local feature embedding model at each respective client of at least a subset of the plurality of clients;
send, to each of the clients of the plurality of clients, information representative of the updates to the global feature embedding model; and
each client of the plurality of clients being configured to:
optimise the local feature embedding model for the respective data set associated with the domain of each client of the plurality of clients;
send, to the central server, information on changes to the local feature embedding model;
receive, from the central server, information representative of the updates to the global feature embedding model;
map on to the local feature embedding model, at least a portion of the received updates to the global feature embedding model; and
update the local feature embedding model based on the mapped updates.

12. The system of claim 11, wherein the respective data set associated with a domain of each client of the plurality of clients is an independent data set.

13. The system of claim 11, wherein the central server being configured to update the global feature embedding model based on the changes to at least a subset of the local feature embedding model at each respective client, comprises the central server being configured to:
select a subset of the plurality of clients;
aggregate the information on changes to the local feature embedding model received from each client of the selected subset of the plurality of client to determine the aggregate changes; and
update the global feature embedding model based on the aggregate changes.

14. The system of claim 13, wherein the central server being configured to aggregate the information comprises the central server being configured to:
average the information on changes to the local feature embedding model received from each client of the selected subset of the plurality of clients.

15. The system of claim 13, wherein each of the local clients is further configured to:
apply white noise to the information on changes to the local feature embedding model, prior to sending to the central server.

16. The system of claim 11, wherein each client of the plurality of clients being configured to receive, from the central server, information representative of the updates to the global feature embedding model comprises:
each client of the plurality of clients being configured to receive the global feature embedding model.

17. The system of claim 11, wherein each client of the plurality of clients being configured to map on to the local feature embedding model, at least a portion of the received updates to the global feature embedding model, comprises each client of the plurality of clients being configured to:
determine a probability distribution for the respective local feature embedding model applied to the data set associated with a domain of the respective client;
determine a probability distribution for the global feature embedding model applied to the data set associated with a domain of the respective client;
determine a divergence between the probability distribution for the respective local feature embedding model and the probability distribution for the global feature embedding model;
based on the determined divergence, identify the updates to the global feature embedding model that are relevant to the local feature embedding model; and
update the local feature embedding model based on the identified relevant updates to the global feature embedding model.

18. The system of claim 11, the central server is further configured to:
deploy the global feature embedding model to a customer client;
wherein the customer client is configured to:
apply the global feature embedding model to characterize a target;
apply the global feature embedding model to characterize each image of a set of candidate images associated with the domain of the customer client; and
use a distance metric to identify the candidate images having sufficient similarity to the target image.

* * * * *